US010121451B2

(12) United States Patent
Goodman

(10) Patent No.: US 10,121,451 B2
(45) Date of Patent: Nov. 6, 2018

(54) AMBIENT LIGHT PROBE

(71) Applicant: ABL IP HOLDING LLC, Conyers, GA (US)

(72) Inventor: Jonathan Lloyd Goodman, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 8 days.

(21) Appl. No.: 15/296,250

(22) Filed: Oct. 18, 2016

(65) Prior Publication Data

US 2017/0116962 A1 Apr. 27, 2017

Related U.S. Application Data

(60) Provisional application No. 62/244,953, filed on Oct. 22, 2015.

(51) Int. Cl.
| | |
|---|---|
| *G01J 1/02* | (2006.01) |
| *G01J 1/42* | (2006.01) |
| *G01J 3/02* | (2006.01) |
| *G01J 3/50* | (2006.01) |
| *G06T 15/80* | (2011.01) |
| *G09G 5/02* | (2006.01) |
| *G09G 5/10* | (2006.01) |

(Continued)

(52) U.S. Cl.
CPC ............ *G09G 5/10* (2013.01); *G01J 1/0219* (2013.01); *G01J 1/0271* (2013.01); *G01J 1/4204* (2013.01); *G01J 1/4228* (2013.01); *G01J 3/0264* (2013.01); *G01J 3/0291* (2013.01); *G01J 3/50* (2013.01); *G01J 3/513* (2013.01); *G06T 15/80* (2013.01); *G09G 3/001* (2013.01); *G09G 5/02* (2013.01); *G06T 2215/16* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 5,705,804 A | 1/1998 | Ramer et al. | |
| 5,971,597 A * | 10/1999 | Baldwin | G01K 1/16 340/540 |
| 8,379,213 B2 | 2/2013 | Zhang et al. | |

(Continued)

FOREIGN PATENT DOCUMENTS

WO 2002101645 A2 12/2002

OTHER PUBLICATIONS

International Search Report and Written Opinion of the International Searching Authority for International Application No. PCT/US2016/057490, dated Feb. 8, 2017, 16 pages.

(Continued)

*Primary Examiner* — Yingchun He
(74) *Attorney, Agent, or Firm* — RatnerPrestia

(57) ABSTRACT

The examples relate to a method and apparatus to measuring ambient light information that is used in the manipulation or augmentation of an image presented on a display. The apparatus measures ambient light characteristic information from at least one direction in an environment in which the apparatus is located. The measured ambient light characteristic enable substantially real time generation and application of an image effect to an image presented on a display device.

12 Claims, 16 Drawing Sheets

(51) Int. Cl.
*G01J 3/51* (2006.01)
*G09G 3/00* (2006.01)

(56) References Cited

U.S. PATENT DOCUMENTS

| | | | |
|---|---|---|---|
| 9,778,102 B2* | 10/2017 | Pang | G01J 1/4204 |
| 2002/0158883 A1 | 10/2002 | Cheri et al. | |
| 2003/0214254 A1* | 11/2003 | Shloush | H05B 41/28 |
| | | | 315/247 |
| 2008/0290803 A1* | 11/2008 | Santo | G09G 3/3413 |
| | | | 315/151 |
| 2010/0201267 A1* | 8/2010 | Bourquin | H05B 37/0227 |
| | | | 315/32 |
| 2013/0249433 A1 | 9/2013 | Martello et al. | |
| 2013/0293877 A1 | 11/2013 | Ramer et al. | |
| 2014/0035807 A1 | 2/2014 | Lee | |
| 2015/0276913 A1* | 10/2015 | Mehrl | G01S 3/781 |
| | | | 250/203.1 |

OTHER PUBLICATIONS

Jason Mitchell et al., "Shading in Valve's Source Engine, SIGGRAPH06", 2007 Valve Corporation, Chapter 8, http://www.valvesoftware.com/publications/2006/SIGGRAPH06_Course_ShadingInValvesSourceEngine.pdf.

* cited by examiner

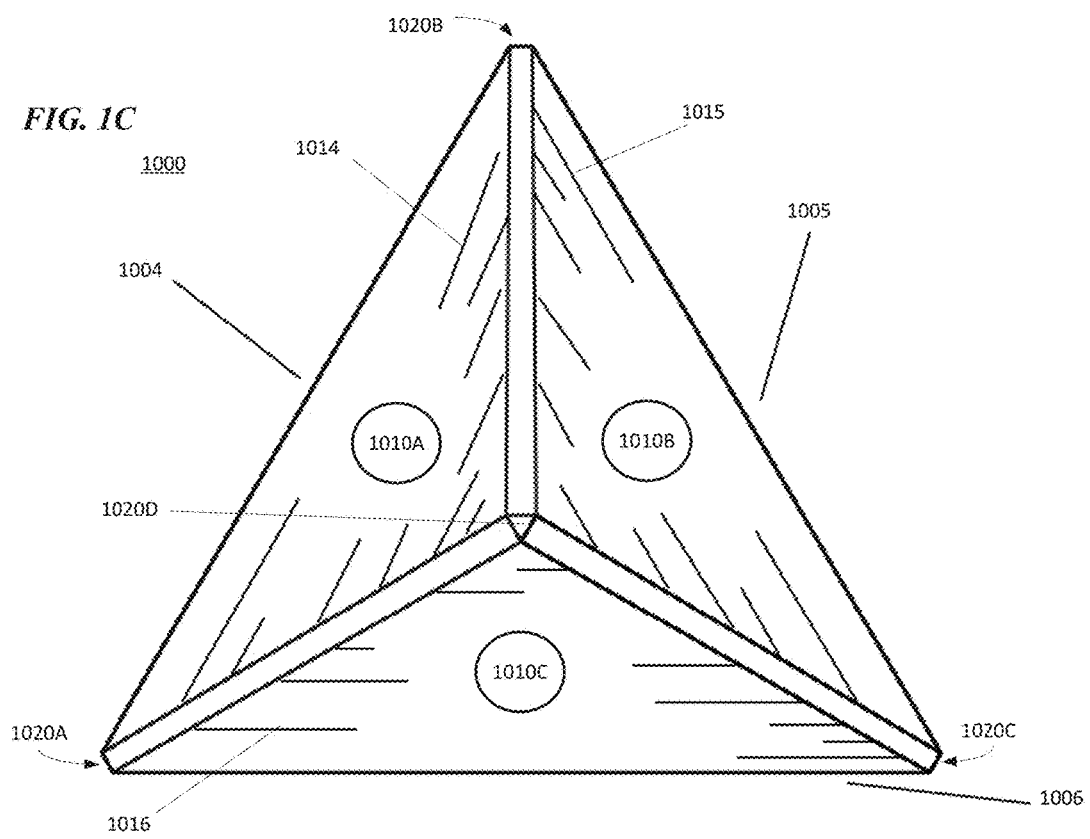

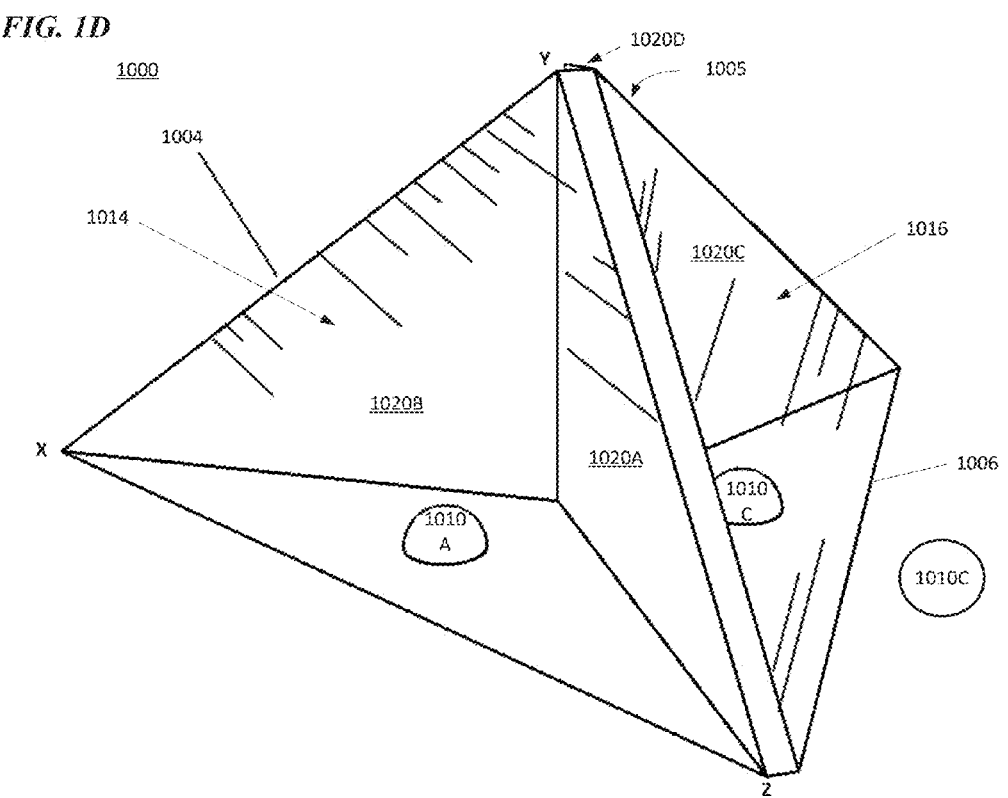

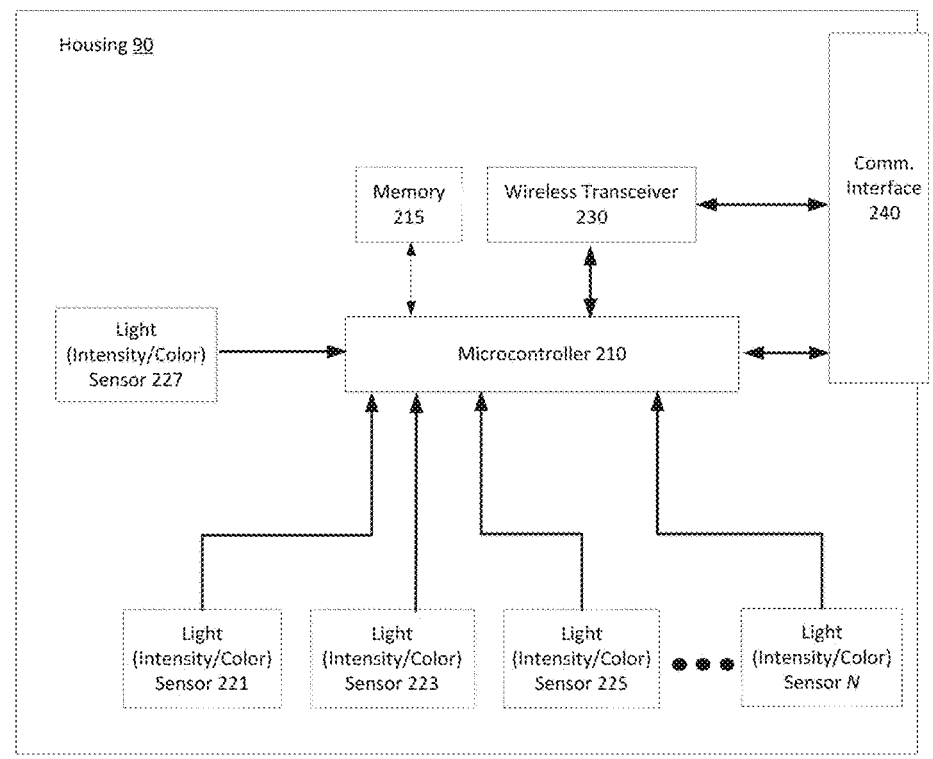

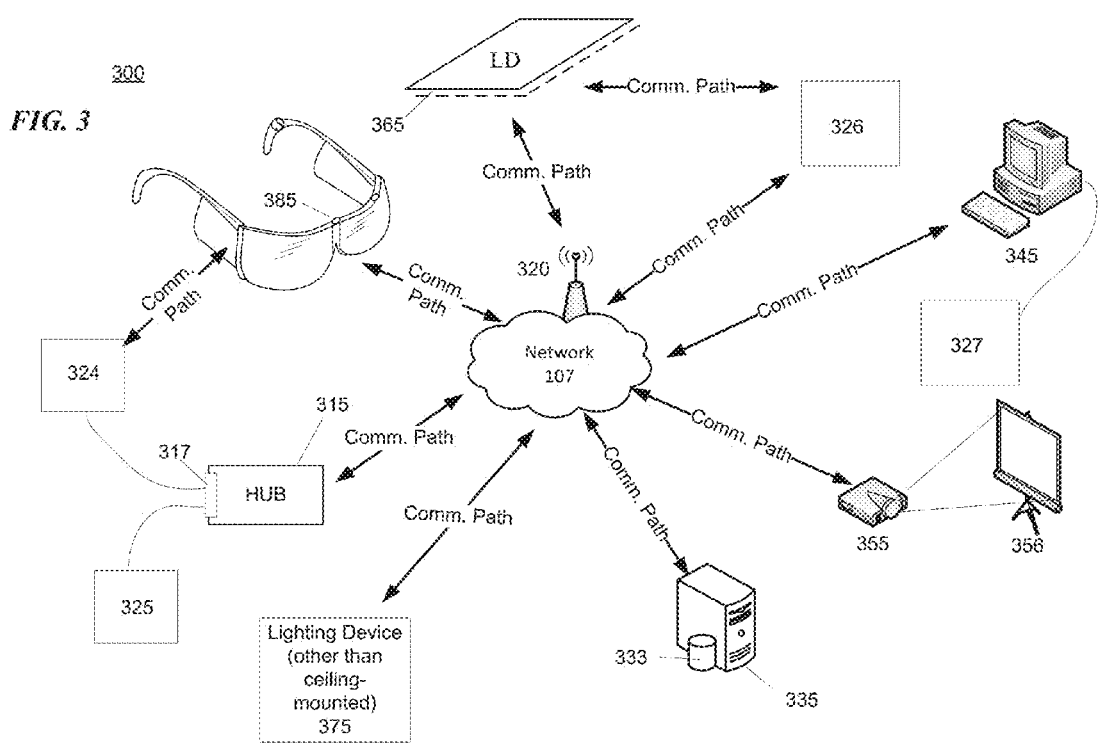

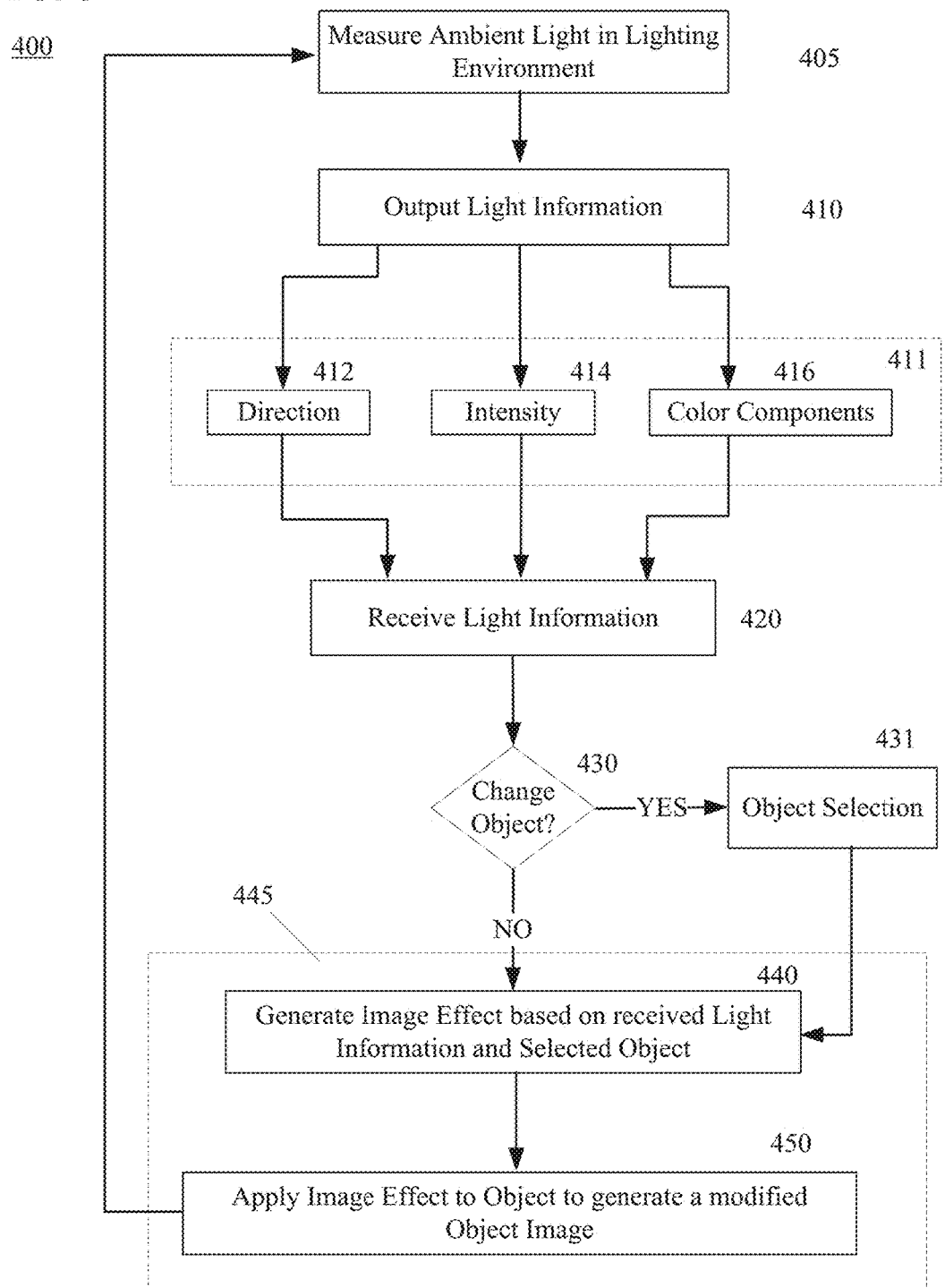

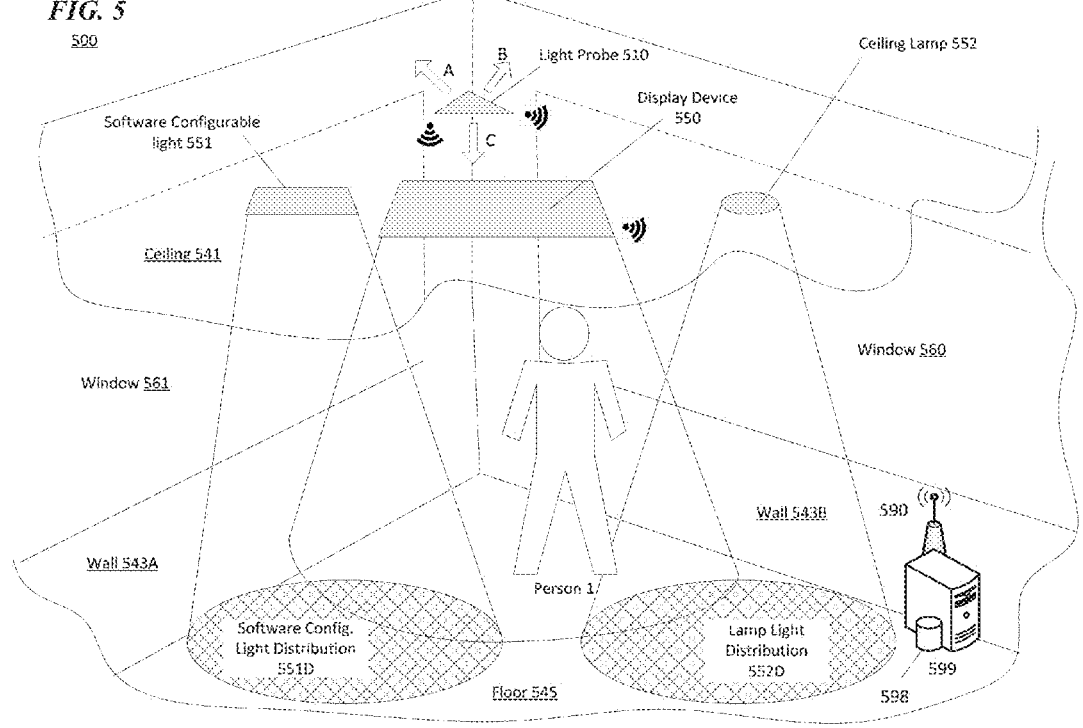

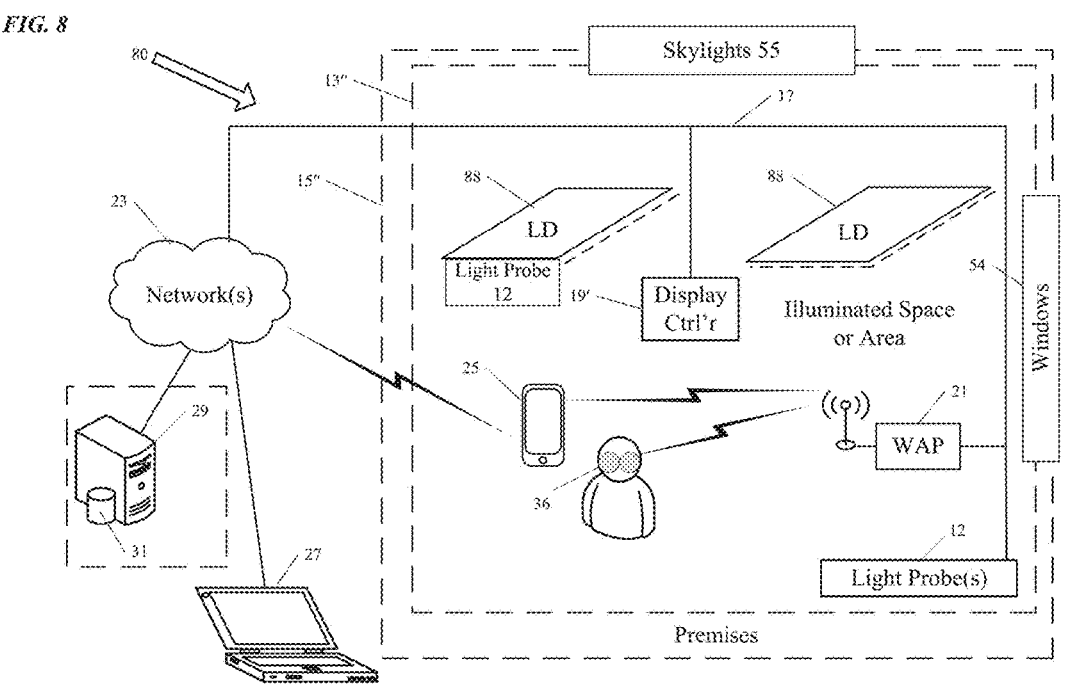

900

900"

AMBIENT LIGHT PROBE

CROSS-REFERENCE TO RELATED APPLICATION

This application claims the benefit of U.S. Provisional Application No. 62/244,953, filed Oct. 22, 2015 and entitled "Ambient Light Probe," the entire contents of which is incorporated herein by reference.

TECHNICAL FIELD

The present subject matter relates to an ambient light probe usable by a display device or the like. The light probe measures light characteristics of ambient light in an environment in which the light probe is located. The configuration of the light probe enables the measured light characteristics to be used to provide a suitable indication of the ambient light characteristics in the environment. The measured light characteristics enable a processor to generate image effects in real-time or substantially real time. A presented image may be augmented according to the effect measured ambient light has on a view of the presented image.

BACKGROUND

When presenting an image on a display, shading is typically provided to indicate a direction of light applied to a viewable surface of an object represented in the image. For example, when viewing a real object in an actual room that is exposed to light from outdoors, such as table near a window, the ambient light on the table typically changes. The changes in ambient light on the object creates shadows and provides depth to the object. A video of the object in the room will capture the changing ambient lighting. Similarly, when presenting an image of a virtual objects on a display, graphic designers, photographers, and videographers aim to provide the most realistic representations of the objects in the image, including shading and shadows. In the graphic arts, the appearance of a computer generated object may be manipulated using software. Digital photographs and video images may also be augmented using software programs to achieve a desired, such as realistic, appearance of an object in a digital photograph or video. For example, a presented image may be selected from images of luminaires, landscapes, sky scenes, other real world scenes, graphic object, an animation, an art installation, a video (i.e., series of image frames), a video segment or the like.

However, of particular interest to the subject matter described herein is the manipulation of the lighting of a scene or object. Different software applications, such as Valve Software's Source Engine, provide rendering techniques that allow for fast and efficient static lighting in a three-dimensional (3D) virtual environment. Typically, these software applications are confined to the capture of simulated light from a ray tracer, and not the capture of characteristics of illumination from real world sources. In a gaming software development environment, the game scenes are known apriori or may be constructed based on predetermined positions of sources of light. The software applications may be intended for static lighting, and are not typically responsive to real-time lighting conditions, where the light environment can change.

SUMMARY

Hence, for the reasons outlined above or other reasons, there is room for further improvement in equipment and techniques for capturing lighting information, that measures ambient light intensity and color using a fixed array of sensors.

An example of lighting probe includes a housing, a first sensor group, a second sensor group, and a communication interface. The housing has a surface with a perimeter. The first sensor group includes a number of light sensors. Individual light sensors of the first sensor group are positioned in predetermined locations about the perimeter of the housing surface and oriented to receive ambient light from different respective directions. Each of the light sensors of the first sensor group is configured to output a light intensity value in response to ambient light received at the respective predetermined location. The second sensor group includes one or more light sensors positioned at a central position of the housing. The second sensor group is configured to output color component values in response to ambient light received by the one or more light sensors at the central position of the housing. A communication interface is coupled to the first sensor group and the second sensor group, and is configured to output light information representing the light intensity values and the color component values.

Other examples describe a lighting probe including a number of ambient light sensors, a housing and circuitry coupled to the number of sensors. The sensors are attached to the housing at predetermined locations relative to an axis perpendicular to a reference surface. The at least one of the number of ambient light sensor is attached to the housing at respective predetermined location about the axis and oriented to receive and measure ambient light from a first direction. A centrally located ambient light sensor of the number of light sensors is attached to the housing at a predetermined location and is oriented to receive and measure a color characteristic of ambient light along, about or at least substantially parallel to the reference surface. The circuitry produces directional light intensity data based on the measurements by the at least one ambient light intensity sensors and produces ambient light color characteristic data based on the measurement by the ambient light color characteristic sensor.

A light sensing system example provides a system including a light probe, an image display device, and a processing system. The light probe includes directional light intensity sensors and a color component sensor. The directional light intensity sensors are configured to measure light intensity of ambient light received from more than one direction with respect to a center point of the light probe. The color component sensor is configured to measure color components of the ambient light. The image display device presents an image. The processing system is in, or in communication with, the image display device, and includes a memory, a processor, and programming in the memory. Execution of the programming in the memory by the processor configures the light sensing system to perform functions. The functions include obtaining a selected image for output via the display device; obtaining ambient light information measured by the light probe; modifying the selected image by applying an image effect that is generated at least in response to the ambient light information; and controlling operation of the image display device to present the modified image.

Another example provides a method that includes a step of presenting an image of an object on a display device located in a premises. An intensity of the ambient light in the premises is measured by a first sensor of a probe. The first sensor being positioned and oriented in a first direction with reference to a central axis of the probe. An intensity of the ambient light in the premises is measured by a second sensor of the probe positioned and oriented in a second direction with reference to the central axis of the probe. An intensity of the ambient light in the premises is measured by a third sensor of the probe positioned and oriented in a third direction with reference to the central axis of the probe. The first, second and third directions are different from one another. Color components of the ambient light are measured by a color component sensor of the probe. In real time, ambient light intensity values based on the measurements by the first, second and third sensors and direction values indicating the direction from which the ambient light intensity value was measured are provided. Color component values of the ambient color components based on the measurements by the color component sensor are provided in real time. A processor generates an image effect utilizing the provided ambient light intensity values, direction values and color component values that accounts for the changes of ambient light in the premises. The generated image effect is applied to the image of the object presented on the display device to provide a modified image. The applied generated image effect alters an appearance of the image on the display device based on changes to ambient light in the premises.

Another example provides a method for measuring, by a light probe, ambient light in a lighting environment from four different directions. A processor outputs the measured ambient light as light information. The light information includes light intensity values of the measured ambient light from at least three of the four directions and color component values of the measured ambient light from a fourth of the four directions. The processor generates an image effect using the received light information. The image effect is applied to an image of an object presented on a display device.

In yet another example, a light probe is disclosed that includes a number of ambient light sensors, a housing, and circuitry coupled to the ambient light sensors. Each of the number of ambient light sensors measures a characteristic, such as intensity and/or color characteristics, of ambient light. The housing has a number of predetermined locations at which respective individual light sensors of the number of light sensors are positioned The circuitry, coupled to the light sensors, produces light characteristic information based on the measurements by each of the number of the light sensors.

In an example, a light probe is disclosed that includes a number of ambient light sensors, a housing, and circuitry coupled to ambient light sensors. Each of the number of ambient light sensors measures a characteristic of ambient light. The housing has a number of predetermined locations at which respective individual light sensors of the plurality of light sensors are positioned. The circuitry produces light characteristic information based on the measurements by the light sensors and an indication of a direction from which the ambient light characteristic is measured.

Some of the described examples disclose an apparatus that includes a display device and means for enabling the display utilize the real-time ambient lighting information obtained by the probe to control an image output of a configurable lighting device. The lighting device may also produce an illumination light output with industry acceptable performance for a general lighting application of a luminaire. The display device is configured to produce an image display output.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1C is a top-view of another example of a light probe.

FIG. 1D is an isometric view of the light probe example shown in FIG. 1C.

FIG. 2 is a high-level functional block diagram illustrating examples of components of a light probe, such as the light probe shown in FIGS. 1A and 1B.

FIG. 3 is a high-level network diagram illustrating an example of a system(s) utilizing, for example, a light probe, such as shown in FIGS. 1A to 2.

FIG. 4 is a flow chart illustrating an example process flow utilizing a light probe, such as that described with reference to FIGS. 1A to 2, e.g. in a networked system like that of FIG. 3.

FIG. 5 illustrates a high-level example of an environment in which a light probe and, such as those shown in FIGS. 1A to 3, may be used.

FIG. 8 is a high-level networking block diagram illustrating yet another example of a system including a light probe, such as that shown in FIGS. 1A to 2 in yet another environment example.

DETAILED DESCRIPTION

Figure 1A:
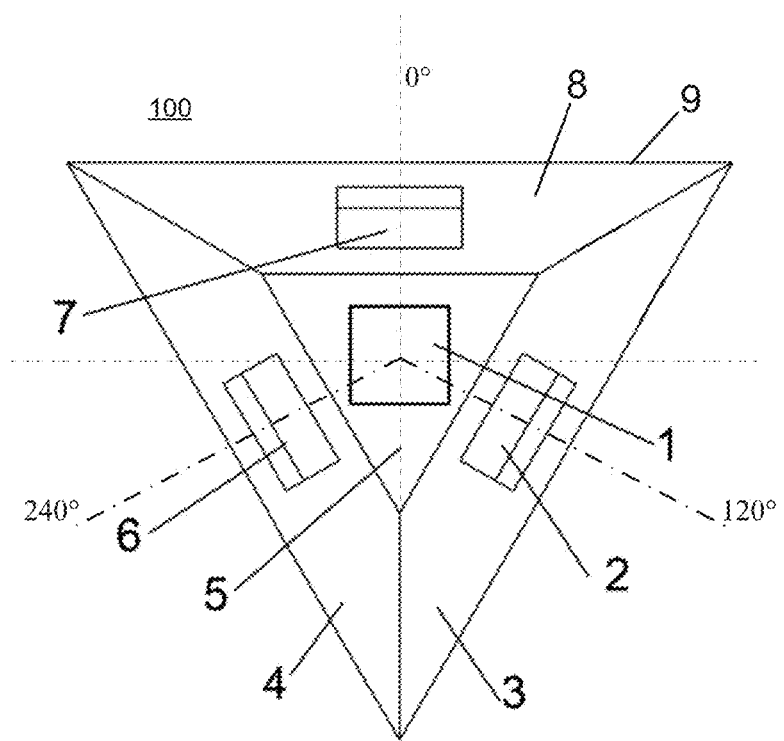
FIG. 1A is a top-view of an example of a light probe.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The general concept of relighting virtual objects is not new, and apparatuses have been designed to capture ambient light environment information for enhancing virtual lighting in display images. For example, systems have been developed that utilize a curved reflective surface and an image sensor to capture actual lighting data for use in enhancing virtual reality or other image displays. The problem with this approach is it produces information that requires lengthy pre-processing that often requires higher performance computer hardware. As a result, the obtained data is not directly usable for real-time applications. In addition, the obtained data is better suited for capturing spatial lighting information, not the capture of lighting information at or on a surface.

The various examples disclosed herein relate to a light probe that measures ambient light where the light probe is located. In an example, the light probe sensors measure visible light characteristics, such as light intensity, individual color component values, such as Red-Green-Blue (RGB) component intensity values, and the like, of ambient light in the environment surrounding the light probe. As an alternative to capturing light in the visible light spectrum, the light probe sensors may capture light in the infrared spectrum or the ultraviolet light spectrum. The light probe sensors may include silicon diodes, phototransistors, photomultiplier tubes, or other forms of photodiodes configured to operate with light in the infrared or the ultraviolet light spectrums.

The light probe in some examples passes data indicative of the measured light characteristics to an image processor, or in other examples processes the measured light characteristics to provide image effect data. In either group of examples, the light probe enables image effects to be generated that enhance the presentation of an image displayed, e.g. displayed in the vicinity of the light probe or displaying an image using the lighting environment in the vicinity of the light probe.

The examples described in detailed below and shown in the drawings typically implement one or more techniques to enhance real time generation of image effects based on ambient light detected by the light probe.

An example of the disclosed light probes captures ambient light information on a pre-determined directional basis. This allows for the relighting (e.g., updating of the lighting applied to a virtual object) of virtual objects in a simulated three-dimensional (3D) environment in real time using a very minimal representation of the ambient lighting environment.

In some examples, the light probe has light sensors, such as four photodiode devices. In such an example, three photodiode devices are arranged as a first sensor group within a light probe housing based upon a predefined directional basis. The fourth photodiode device in such an example is part of a second sensor group, being positioned at a central position, such as the top center, of the light probe housing, providing an additional directional input. The first group of three photodiode devices, in an example, only measure overall light intensity, such as a substantial portion of (e.g., greater than 75%) or all of the visible light portion of the electromagnetic spectrum, received from the environment in three different directions, while the fourth photodiode device in the second group measures color component intensities. In particular, the overall intensity is directed to include color component intensities are humanly visible light intensities. With the information captured by these photodiode devices, an efficient and sparse representation of the ambient lighting conditions local to whatever surface on which the light probe is mounted may be created.

The photodiode devices in the first group arranged on the perimeter of the light probe may be interchangeable and typically capture light in the visible light spectrum. An example of a suitable photodiode device for measuring light intensity is an off-the-shelf ambient light sensor from Intersil™. At least one color component sensing photodiode device is required to capture the environment's light color characteristics, such as an red-green-blue (RGB) color sensor from Hamamatsu™. Of course, alternatively or in addition, other color component values, such as amber, white or the like, may also be measured by an appropriately configured photodiode device. Accuracy is typically more important at lower light levels than higher light levels due to the application of the information produced by the photodiode devices. The photodiode devices, for example, may be a photodiode with a RGB color filter or a combination of 3 photodiodes each configured with a separate color filter (e.g., separate Red filter for a first photodiode, a Green filter for a second photodiode, and a Blue filter for the third photodiode). Each of the respective colored photodiodes output a light characteristic value that is measure of the intensity level of the respective color. For example, a Red-colored filtered photodiode provides an ambient light intensity value measured from the ambient light within a predetermined red spectral bandwidth. Similarly, green, blue, amber or other colored light sensors provide ambient light intensity values based on measured ambient light and the colored light sensors predetermined color spectral bandwidth. The color spectral bandwidth may be predetermined by the type of sensor, the type of color filter, or a combination of both. To obtain a representative overall intensity of the ambient light measured by the light probe, the respective colored intensity levels output be each of the respective color (e.g., Red, Green, Blue) photodiodes may be summed. The summed intensity values of the ambient light may be used by the processor for used in determining the needed image effect.

FIG. 1A is a top-view of an example of a light probe. In FIG. 1A, the light probe 100 includes a color component sensing photodiode, or light sensor, 1 that is, for example, a photodiode that detects color components, such as RGB, of the light in the area surrounding the light probe 100. The light probe 100 includes a light sensor array of photodiodes 1, 2, 6 and 7 that are divided into different groups of sensors. A first group of light sensors of the light probe 100 includes light sensors 2, 6, and 7 that detect the intensity of the local ambient lighting environment and encode the detected light intensity into light intensity values. A second group of at least one light sensor includes, in this example, a color component sensing photodiode 1, that detects the color characteristics of the ambient light. In an example, the light sensor 1, in response to the detected ambient light, encodes the detected color components of the local lighting environment into color component data values.

The light sensors 1, 2, 6 and 7 are disposed in a housing 9. The housing 9 includes surfaces 3, 4, 5, and 8 at which the light sensors 1, 2, 6 and 7 are arranged. For example, the light sensors 1, 2, 6 and 7 are attached in the housing 9 at predetermined locations relative to a central vertical axis perpendicular to a reference surface. The central vertical axis, for example, may pass through light sensor 1 at the center point corresponding to the intersection of the dashed lines in FIG. 1A, and coming out of the page. The individual light sensors of the first group of light sensors 2, 6 and 7 are arranged in predetermined locations about the perimeter of the housing 9 and each of the light sensors of this first group outputs a light intensity value in response to ambient light received at the predetermined location of each respective light sensor. The first (e.g., sensor 7), second (e.g., sensor 2) and third (e.g., sensor 6) ambient light intensity sensors are attached to the housing 9 at predetermined locations about the central vertical axis and oriented to receive and measure ambient light from three respective different directions. A second group of one or more light sensors, such as light sensor 1, are arranged at a central position, such as the center of top surface 5, of the housing 9. The second sensor group outputs color component values in response to ambient light received at the central position (e.g., approximately at the center of the top surface 5) of the housing 9. The ambient light color characteristic sensor (e.g., sensor 1) is attached to the housing at a predetermined location and oriented to receive and measure a color characteristic of ambient light along, about or at least substantially parallel to the central vertical axis passing through the central position of the housing 9.

In some examples, all of light sensors 1, 2, 6 and 7 are mounted directly to an interior surface of the housing 9. The housing 9 is configured to have openings, or windows, at predetermined locations about the perimeter of the housing 9 for the respective light sensors 1, 2 6 and 7 so each light sensor may detect a characteristic of the ambient light of the local lighting environment. In the example illustrated in FIG. 1A, the light sensors 2, 6 and 7 are positioned at a predetermined location, specific angle and in a predetermined orientation relative to the central vertical axis passing through a center of the housing 9 at sensor 1 and a horizontal plane parallel to, but opposite the surface 5, such as a bottom surface (not shown). Each of the light sensors 1, 2, 6, 7 has field of view of the centered around an axis extending from a midpoint of the window or openings at the predetermined locations about the perimeter. The sensors' field of view axis is perpendicular to the housing surface to which the respective light sensor is positioned. Each of a first group of sensors including light sensors 2, 6 and 7 are arranged at approximately 0°, approximately 120° and approximately 240°. In three dimensional space, for example, surface 8 is configured to have a Euler surface angle with approximately a 270 degree roll, approximately 90 degree yaw, and approximately 330 degree pitch. The orientation of the light sensor 7 input may be the same as the surface 8, and the light sensor 7 field of view axis is perpendicular to surface 8. For surface 5, the angle of the surface should have approximately a 0 degree roll, approximately 0 degree yaw, and approximately 90 degree pitch. The orientation of the light sensor 1 input may be the same as the surface 5, and the light sensor 1 field of view axis is perpendicular to surface 5. For surface 4, the surface angle should have approximately a 150 degree roll, approximately 210 degree yaw, and approximately 324.7356 pitch. The orientation of the light sensor 6 input may be the same as the surface 4, and the light sensor 6 field of view axis is perpendicular to surface 4. For surface 3, the surface angle should be approximately a 30 degree roll, an approximately 330 degree yaw, and an approximately 324.7536 pitch. The orientation of the light sensor 2 input may be the same as the surface 3, and the light sensor 2 field of view axis is perpendicular to surface 5. Of course, other angles, including roll, yaw and pitch, may be used that permit acceptable differentiation between measured light characteristics in the lighting environment.

In this example, it is assumed that the light probe is typically mounted on a ceiling and facing down towards a floor or other surface, such as a countertop, desktop, work space, tabletop or the like, below the light probe. In such an example, the ceiling would be the reference surface discussed above. However, the light probe may also be placed on a surface with the top surface 5 facing upward. The light probe 100 includes a bottom surface (not shown) that is opposite the top surface 5.

An advantage of the housing 9 design illustrated in FIG. 1A is that the design focuses on capturing ambient light characteristic information in four (4) directions with the acknowledgement of the offset between data quality and cost being taken into account. In particular, while more sensors yield better data quality due to the additional sample points, the additional sensors add complexity that results in added performance costs (e.g., delays due to more processing time, more powerful and faster processors to process the additional data) that leads to an added financial cost as well. The presented examples yield a minimal data set for generation of an image effect, yet provides a reasonable balance between performance and financial cost.

In the foregoing example, the light sensor 1 was identified as being an ambient light color characteristic sensor. The ambient light color characteristic sensor 1 detects color by detecting an intensity of a specific color, such as blue, and outputs a color intensity value corresponding to the blue light in the detected ambient light.

While the light sensors 2, 6 and 7 were identified as ambient light intensity sensors, and light sensor 1 was identified as an ambient light color characteristic sensor, the light probe 100 may have any combination of ambient light intensity sensors or ambient light color characteristic sensors. For example, light sensors 1 and 2 may be ambient light intensity sensors, and light sensors 6 and 7 may be ambient light color characteristic sensors. Other examples may have other combinations of ambient light intensity sensors or ambient light color characteristic sensors.

Figure 1B:
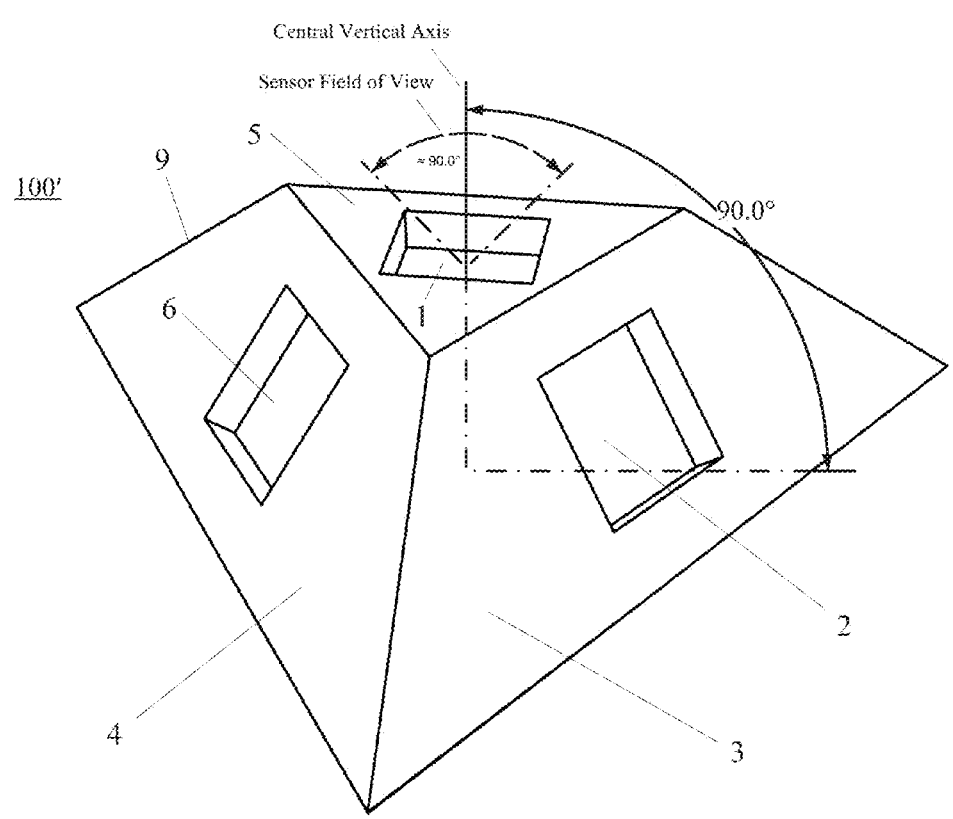
FIG. 1B is an isometric view of the light probe example shown in FIG. 1A.

FIG. 1B is an isometric view of the light probe example shown in FIG. 1A. The isometric view 100' in FIG. 1B illustrates the placement of the photodiode devices 1, 2 and 6 on the housing 9. The color component photodiode device 1 is positioned in a central position at substantially the center of top surface 5. To more easily envision, the structure of the housing 9 and the respective components, a central vertical axis is shown passing through the center of photodiode device 1. In an example, a field of view of photodiode device 1 over which the photodiode sensor 1 measures ambient light values is shown as approximately 90°, which may be typical of all of the photodiode devices 2, 6 and 7 used in the light probe. However, the field of view of the photodiode devices may be larger or smaller based on the application and/or the intensity values desired by a user. The angles of surfaces 3 and 4 are more distinct in the example of FIG. 1B as compared to that of FIG. 1A. The light probe 100' includes, like the light probe 100 of FIG. 1A, a bottom surface (not shown) that is opposite the top surface 5.

The light probe 100', or 100 of FIG. 1A, may be affixed to a supporting surface, such as a ceiling, wall, furniture via fasteners (not shown) on the bottom surface. Alternatively, the light probe 100' or 100 may be a standalone device that simply is placed on a surface, such as piece of furniture, a counter top, a shelf or the like. The light probe 100 or 100' includes a number of ambient light sensors, such as 1, 2, 6, 7, a housing 9 and circuitry (shown in other examples) coupled to the ambient light sensors. Each of the number of ambient light sensors measures a characteristic, such as intensity and/or color characteristics, of ambient light. The housing 9 has a number of predetermined locations at which respective individual light sensors of the number of light sensors are positioned The circuitry, coupled to the light sensors, produces light characteristic information based on the measurements by each of the number of the light sensors.

Other examples of light probes may provide different housing configurations that enable more or less sensors, but provide substantially the same functions as the light probes 100 and 100' of FIGS. 1A and 1B, respectively. These other examples will now be described with reference to FIGS. 1C-1F.

FIG. 1C is a top-view of another example of a light probe. The illustrated light probe 1000 is pyramidal with sides 1004, 1005 and 1006. Structures 1020A-1020C create separate areas in which the respective sensors 1004, 1005 and 1006 may be positioned. The structures 1020A-1020C shield the respective sensors from measuring light from another respective A center vertical axis of the light probe 1000 is indicated by 1020D. The illustrated light probe 1000 may have one or more ambient light sensors 1010A-1010C mounted to the bottom surface of the light probe 1000. The ambient light sensors 1010A-1010C may be ambient light intensity sensors, ambient light color characteristic sensors, or any combination thereof.

Optical elements 1014, 1015 and 1016, such as prisms, directional lens, optical grating or the like, are positioned in the areas formed by the structures 1020A-1020C. The optical elements direct the ambient light from the respective direction toward the respective sensors 1004, 1005, and 1006. The optical elements 1014, 1015 and 1016 may be formed from an optical material that enables light to pass substantially unimpeded. The sensors 1004, 1005 and 1006 are substantially similar to sensors 1, 2, 6, and 7 of FIGS. 1A and 1B.

The overall functions of the light probe 1000 and light sensors 1004, 1005 and 1006 are substantially the same as the functions described with reference to light probes 100 and 100' and their respective sensors as described above with respect to the ambient light sensors of FIGS. 1A-2. Similarly, the operation of the light probe 1000 is substantially similar to the following examples, albeit with more or less sensors. A reference surface, in this example, is the surface upon which the light probe 1000 rests such that all of the light sensors 1010A, 1010B and 1010C are able to measure ambient light in the space in which the light probe is placed. The central vertical axis is perpendicular to the reference surface and passes through center point 1020D. While pyramidal light probe 100 is shown as three-sided it is envisioned that more or less sides may be provided that either include or do not include an ambient light sensor.

FIG. 1D is an isometric view of the light probe example shown in FIG. 1C. FIG. 1D illustrates the structures 1020A, 1020B and 1020C of the light probe 1000 that support the optical elements 1014 and 1016. For example, the optical element 1014 is positioned within the XYZ triangle. The light probe side 1005, light sensor 1010B and optical element 1015 are not shown in this view, but are understood to be positioned behind structures 1020B and 1020C. As shown, center point 1020D is located at the intersections of structures 1020A, 1020B and 1020C.

Figure 1E:
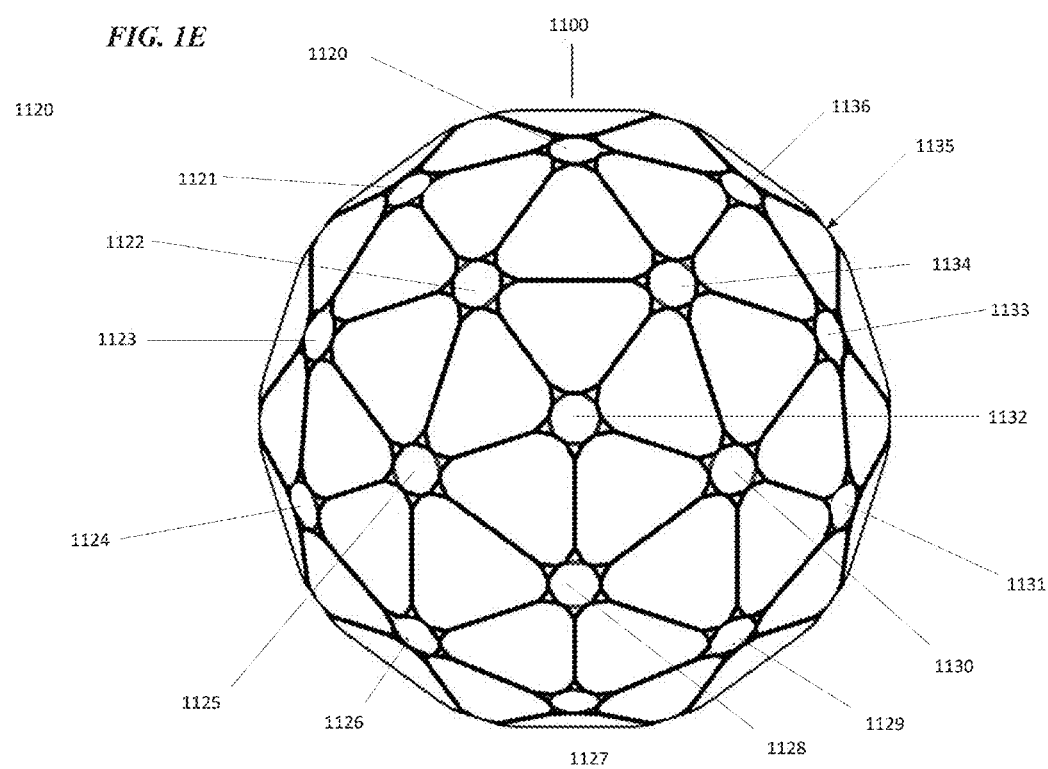
FIG. 1E is a top-view of yet another example of an N-sided light probe.

FIG. 1E is yet another example of an N-sided light probe. The light probe 1100 of this example is a spherical light probe with an array of ambient sensors. Only sensors 1120-1136 are shown in the illustrated example, but it should be understood that other ambient light sensors are present is substantially similar locations on the side of the spherical light probe 1100 not shown in this view. The ambient light sensors may be all intensity ambient light sensors, all ambient light color characteristic sensors, or any combination of intensity or color sensors.

The light probe 1100 is configured with light sensors positioned at predetermined locations, such as 1120-1136, about a central axis passing through a vertical center point of the light probe 1100. The reference surface may be any surface that the light probe 1100 is located.

Figure 1F:
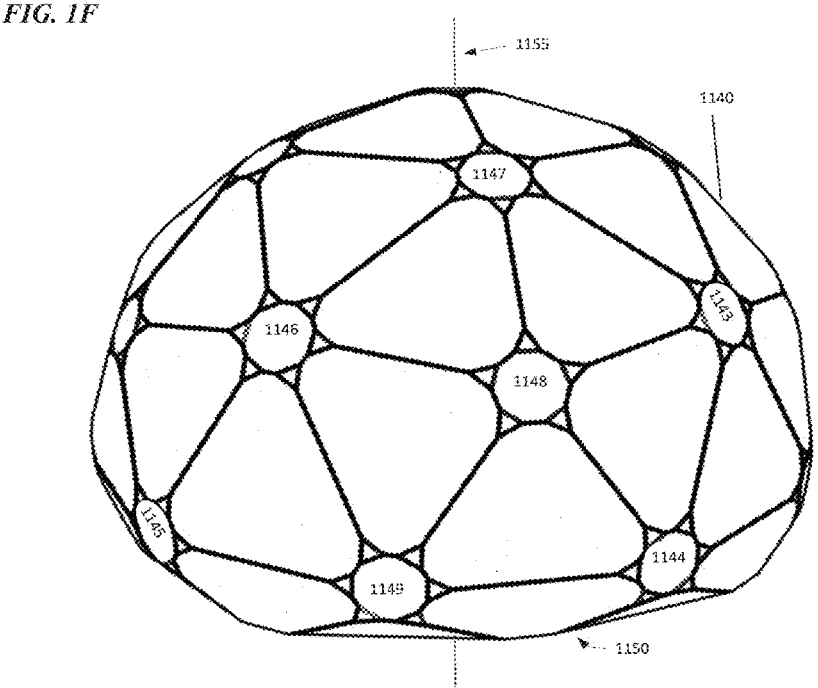
FIG. 1F is an isometric view of the N-sided light probe example shown in FIG. 1E.

FIG. 1F is an isometric view of another example of an N-sided light probe. A light probe 1140 as shown in FIG. 1F includes a number of ambient light sensors positioned around the hemispherical surface of the light probe 1140 at predetermined positions, such as those shown at locations 1143-1149, about a central axis 1155 passing through a vertical center point of the light probe 1140. Of course, other ambient light sensors may be positioned at predetermined positions on the back side (not shown) of the light probe 1140.

The overall functions of the light probes 1100 and 1140 and their respective light sensors 1120-1136 and 1143-1149 are substantially the same as the functions described with reference to light probes 100 and 100' and their respective sensors as described above with respect to the ambient light sensors of FIGS. 1A-2. Similarly, the operation of the light probes 1100 and 1140 is substantially similar to the following examples, albeit with more or less sensors.

An example of internal components of the light probe 100 or 100' illustrated in FIGS. 1A and 1B will now be discussed with reference to FIG. 2.

FIG. 2 illustrates a high-level functional block diagram of examples of components a light probe, such as a light probe shown in FIGS. 1A and 1B.

A light probe 200 may include at least one ambient light sensor, such as 221, or also sensor 223 to sensor N, where N is an integer, microcontroller 210, a wireless transceiver 230, and a communication interface 240. As shown in the parenthetical label of each of the ambient light sensors 221, 223, 225 and 227 in the example of FIG. 2, each of the ambient light sensors 221, 223, 225 and 227 may be configured as either an ambient light intensity sensor or an ambient light color characteristic sensor. Different combinations of light intensity sensors and ambient light color characteristic sensors may be used in a light probe, such as that shown in FIG. 2. Of course, additional examples are envisioned in which one or more the first, second and third ambient light sensors 221, 223, 225 are configured as ambient light color characteristic sensors, and the fourth ambient light sensor 227 is configured as an ambient light intensity sensor. However, for ease of discussion and illustration, the ambient light sensors 221, 223 and 225 will be described as the at least one ambient light intensity sensor, and ambient light sensor 227 will be described as an ambient light color characteristic sensor. The ambient light sensors after sensor 225 to N may be either ambient light intensity sensors, ambient light color characteristic sensors or a combination of both. The light probe 200, in an example, may include a memory 215. The memory 215 may be used to store light information and/or programming code or instructions as well as computer application code, such as image processing applications or the like. The foregoing components of the light probe 200 may be arranged within a housing 90, configured such as housing 9 of FIGS. 1A and 1B. Each of the sensors 221-N is coupled to the microcontroller 210.

In an example, the housing 90 is a structure to which the sensors 221, 223, 225 and 227 are attached at predetermined locations relative to a central vertical axis perpendicular to a reference surface. A reference surface may be a ceiling, a wall, a desktop, a floor, a countertop, a luminaire, chair or any other surface on which the light probe 200 is placed or affixed. Said differently, the reference surface is a surface parallel, or substantially parallel, to surface 5 (of FIGS. 1A and 1B). Of course, the housing 90 may include additional sensors In an example, the first 221, second 223 and third 225 ambient light intensity sensors are attached to the housing 90 at respective predetermined locations about the central vertical axis and oriented to receive and measure ambient light from three respective different directions. In operation, for example, each of the first 221, second 223 and third 225 ambient light intensity sensor produces directional light intensity data based on the light intensity measured at the respective predetermined location about the central vertical axis. The ambient light color characteristic sensor 227, in this example, is attached to the housing 90 at a predetermined location, such as at surface 5 of FIG. 1A or 1B, and oriented to receive and measure a color characteristic of ambient light along, about or at least substantially parallel to the central vertical axis. The light probe as described in the example may include a first group of light sensors 221, 223, and 225, and a second group of light sensors, such as 227. The first light sensor 221 of the first sensor group has a sensor field of view axis that is perpendicular to a surface (shown in examples of FIGS. 1A, 1B, 1C, 1D, 1E and/or 1F) of a housing 90 at the predetermined location at which the first sensor is positioned. Similarly, the second light sensor 223 and third light sensor 225 also have field of view axes perpendicular to a surface of the housing at the predetermined location at which the second light sensor 223 and the third light sensor 225 of the first sensor group are respectively positioned.

Each of the sensors 221, 223 and 225 is coupled to circuitry (not shown) that produces directional light intensity data based on, or in response to, the measurements by the first 221, second 223 and third 225 ambient light intensity sensors. Similarly, other circuitry is coupled to the color characteristic sensor 227 that produces ambient light color characteristic data based on, or in response to, the measurement by the ambient light color characteristic sensor 227.

The sensors 221, 223 and 225 may be any number of different types of electronic light responsive devices, such as a type of photodiode. For example, different types of photodiode devices generate an electrical signal bearing a known relationship to the amount or degree or the like of a light that the photodiode detects. The circuitry may be an analog-to-digital converter that converts the received photodiode device output into a digital value, and a processor that further processes and formats the digital values output be the light sensor. However, most implementations, particularly those in the examples, utilize sensors that include at least some circuitry for processing the output of the photodiode devices included as part of the sensor. The circuitry of such a sensor may also receive and respond to a signal received from the microcontroller 210.

Similarly, the color characteristic sensor 227 is also coupled to circuitry that generates color component data from the output of the color characteristic sensor 227. Alternatively, the analog-to-digital circuitry may be within the microcontroller 210. For example, the color component values output by the one or more light sensors of the second sensor group are individual intensity values of different light colors measured in response to the ambient light received by the one or more light sensors at the central position (e.g., the approximate center point of surface 5 of FIGS. 1A and 1B) of the housing 90. In more detail, the one or more light sensors 227 of the second group positioned at the central position of the housing are configured to be about or at least substantially parallel to a central axis (as shown in FIG. 1B) of the housing 90 that is perpendicular to a reference surface. The one or more light sensors 227 measures a color characteristic of ambient light along, about or at least substantially parallel to the reference surface.

Regardless of the location of the circuitry, the light information measured by the respective sensors 221-227 is provided to the microcontroller 210. The microcontroller 210 processes the received light information, which is described in more detail with reference to FIG. 4. Depending upon the implementation, the microcontroller 210 may receive the raw measured signals, e.g., a voltage value or a current value, output by the respective sensors 221-227 and generate via the circuitry a data value indicative of the measured light intensity or light color characteristic. These data values may be passed via the communication interface 240 to an external processor (described in other examples) for use in an image processing computer software application that generates an image effect based on the measured light information. Alternatively, the microcontroller 210 may process the light information using an image processing application or other programming code to generate an image effect in response to, or based on, the light information provided by the respective sensors 221-227. The communication interface 240 may include serial communication interfaces, parallel communication interfaces, wired and wireless communication interfaces or the like.

The processed light information may be provided by the microcontroller 210 to either the wireless transceiver 230 for wireless communication, or to the communication interface 240 for wired communication, with an external device, such as a display device.

The wireless transceiver 230 may be enabled to communicate at one or more frequencies and via one or more wireless protocols, such as Bluetooth, Bluetooth low energy, Zigbee, Wi-Fi, cellular or the like. The wireless transceiver 230 may have embedded antennas or direct connections to antennas located within the housing 90. Alternatively, the communication interface 240 may facilitate the connection to antennas suitable for communication by the wireless transceiver 230. In addition or alternatively, the communication interface 240 may have connections that facilitate wired connections via coaxial cables, Ethernet cables, Cat3 telephone wire or the like. For example, a wired Ethernet communication interface may be used to enable network communication using standard networking hardware. Alternatively, a single probe, such as 327 of FIG. 3 may communicate with a device, such as 345, via a much simpler serial connection via the communication interface 240. The communication interface 240 enables the light probe 200 to be incorporated into a network of devices that may use the light information measured by the light probe 200.

A general system of networked devices that may use the light information provided by a light probe, such as light probe 200 will now be described in more detail with reference to FIG. 3.

The system 300 includes one or more light probes 324, 325, 326, 327, a network 107, one or more devices suitable for displaying an image, such as 345, 355, 365, 375, 385, wireless access point(s) 320 and a processor/server 335. The light probes 324-327 may be configured such as described above with respect to FIGS. 1A-2. The network 107 may be an IP protocol network that internetworks with common networking equipment. The processor 335 may provide a computer image processing application, such as a 3D image processing software. For example, a memory 333 that is accessible by the processor 335 stores the image processing software that utilizes the light information provided by the light probes 324-327 to generate an image effect. In the example of a 3D image processing software, the 3D software application takes the light information provided by one or more of the light probes 324-327 or from hub 317, and generates an image effect for application to a two-dimensional (2D) image of an illuminated 3D object, such a luminaire or other object.

The light probes 324-327 may be coupled to the network 107 via a communication paths. The respective communication paths between light probes 324-327, the network 107 and devices 345-385 may be wireless or wired communication paths. In a wireless implementation, the devices 345-385 that are wireless-enabled may be configured to access the network 107. In the illustrated example, the processor 335 is connected to one or more image output devices, such an augmented reality googles/eyewear 385, lighting devices 365 and 375, a display device 345, and/or a projector 355 (with a display screen 356), via the network 107.

The light probes 324-327 and the output devices 345, 355, 365, 375 and 385 are coupled to the processor 335 via the network 107 and respective communication paths. In contrast to ceiling lighting device 365, the lighting device 375 is another type of lighting device, such as a wall-mounted or a desktop lighting device. The respective communication paths may be either a wired or wireless communication path. For example, the processor 335 may be coupled to a wireless access point or points 320. The wireless access point(s) 320 may be a Wi-Fi, Bluetooth (including Bluetooth low energy (BLE)), Zigbee, or other wireless protocol-enabled access point that enables communication between the processor 335, the light probes 324-327 and the one or more of the output devices 345-385. The wired communication paths may be coaxial cables, Cat3 telephone cables, Ethernet cable or the like.

The connectivity of the light probes 324-327 to the network 107 and/or the devices 345-385 may occur using various mechanisms. For example, as shown in FIG. 3, a hub 315 may be provided that enables many sensors, such as light probes 324 and 325, to connect with the network 107 via a communication path. Each of the light probes 324 and 325 may communicate light information to the hub 315 via, for example, serial interface connections 317. The hub 315 transmits the light information to the network 107 for deliver directly to one or more fixtures 345-385, or to the processor/server 335 for image effect generation. The hub 315 may include a communication interface 317 that enables wired or wireless communication between the hub 315 and the connected light probes. The communication interface 317 also facilitates wired or wireless communication with the network 107. In operation, the hub 315 may package light information according to known data packaging protocols in response to receiving the light information from the connected light probes 324 and 325. The hub 315 may transmit the packaged light information through the hub communication interface 317 to a device 345-385 that will be utilizing the packaged light information.

In another connectivity example, one or more sensors, such as light probe 345, may communicate with a singular device 345 via a serial interface, delivering captured light information directly to the device 345.

A discussion of the association of a light probe(s) with a device(s) will be discussed with reference to a following example.

In a wireless networking example, the light probe 326 may connect to lighting fixtures, such as lighting devices 365 or 375 via the network 107 through Ethernet using common networking equipment. Alternatively, the light probe 326 may connect via a wireless communication path directly to the lighting device 365. The light probe 326 may provide light information to the lighting device 365 or may provide image effect data to the lighting device 365.

With an example of the structural feature of the light probe being provided in FIGS. 1A-3, it may be appropriate to describe an example of the operation of the light probe with reference to FIG. 4.

FIG. 4 is a flow chart illustrating an example process flow 400 that may be implemented by a system including a light probe, such as light probe 325, a processor, such as processor 335, and augmented reality googles 385 of FIG. 3. At 405, the light probe 325 measures ambient light that is local to a given surface at which the light probe 325 is located. The type of surface or its orientation is not relevant, just that the light probe 325 is affixed to a surface, which is a reference surface. The output of the respective light sensors produces light characteristic information that includes light information values 411 that are values indicative of the light intensity 414, and the light color 416 detected by the respective light sensors, as well as a light direction 412 value indicative of the direction from which the ambient light was measured. For example, the light direction 412 values are based on which of the light sensors 2, 6 and 7 of the light probe 100' provided the light intensity values 414 in response to ambient light measured from different directions by the light probe 100'. For example, each of light sensors 2, 6 and 7 may generate an individual direction 412 value and an individual light intensity 414 value. In an example, the color components 416 may also have a directional 412 value that may be used to further enhance color rendering of an image effect generated using the light information values 411.

In addition to the intensity 414 value, light sensor 1 is arranged on top surface 5 of a light probe as shown in FIGS. 1A and 1B. In response to the ambient lighting in the lighting environment, light sensor 1 outputs color component values 416 indicative of the color components of the ambient light in the lighting environment. The light information values 411 that include direction 412 data value, the respective individual light 414 values and the color component 416 values output by the respective light sensors are received, at 420, by a processor, such as processor 335 of FIG. 3.

The processor may determine at 430 whether the object in the scene being presented on the display device (e.g., augmented reality googles 385) has changed, such as another feature of a chair or another object comes into view as the user moves through the room. If the object is unchanged, the process 400 continues from 430 to 440. At 440, the processor 335 uses the received lighting information values 411 to generate an image effect, such as relighting, shading, updating shadows or the like, based on the lighting information values 411. For example, the generated image effect is applied to an image being displayed, or to be displayed, within a computer image processing application, such as a 3D image processing computer software, or the like, being executed by the processor, such as 335 of FIG. 3. Examples of 3D image processing computer software include Valve Software's Source Engine™, Unity Technologies' Unity 3D Game Engine™, Epic Games' Unreal Engine 4™ and the like. In the example of a 3D image processing computer software, the 3D image processing computer software takes the direction 412 data, the intensity 414 data, and the color component data 416 to produce an image effect for presenting a two-dimensional (2D) image of an illuminated 3D object. For example, the light information 411 may be used to determine the length and direction of the shadow cast by an object illuminated by the ambient light. Alternatively, the light information 411 may indicate that the ambient light intensity is diminishing. In response, the processor 335 may generate an image effect, which when applied to the displayed image appears brighter (or dimmer) on the display device, such as augmented reality googles 385. Based on subsequently measured lighting information 411, an image effect with the updated shadow length and direction is generated at 440. The processor 335 applies the generated image effect to produce a modified image. The data of the modified image may be delivered to the display device for presentation.

In an alternative example, the generation of the image effect at 440 and the application of the image at 450 may be combined to be performed in combination at 445. In the combined step 445, the processor updates the object images and display of the object on the augmented reality googles 385. While both processes (i.e., individual steps 440 and 450, and combined step 445) may be performed in real time, or substantially real time, the combined step 445 may provide additional time savings and processing efficiency as compared to the execution of individual process steps 440 and 450.

At 430, if the object that was displayed previously has changed, for example, the gaming environment presented on the display has transitioned from an outdoor location to an indoor location, the gaming system may select a different object for application of an image effect. Alternatively, a user may optionally select an object for simulation at 431. Using the output from step 420 and the selected object at 431, an image effect is generated at 440 and applied to the selected object at 450. Alternatively, the object selected at 431 may be provided to the combined step 445. After the application of the image effect at 450 or combined step 445, the process 400 returns to 405. After passage of a predetermined time, the process 400 may return to step 405 to repeat each of the measuring, providing/receiving, generating and applying steps of process 400.

The process 400 may be performed, or accomplished, entirely by a light probe, such as that shown in FIGS. 1A-2. Referring back to FIG. 2, the processor 210 of a light probe 200 may be configured to perform the process 400 steps of 430, 431, 440, 450 or 430, 431 and 445. For example, the optional memory 215 may be store computer application programming that when executed by the processor 210 enables light probe 200 to generate the desired image effects. Alternatively, the light probe 200 may provide light information to an external processor for generation of the image effects. Although light probe for ease of explanation light probe 100' was described, it should be understood that the above described operations and functions may also be performed by the examples of light probes illustrated in FIGS. 1C-1F.

It may be helpful to now describe an example of an environment, at a high level, in which a light probe and other system components may be implemented.

FIG. 5 illustrates a general example of an environment in which a light probe, such as described with reference to FIGS. 1A-2, may be utilized. The environment 500 is a cut-away view of a corner of an area, such as a room, an office, retail establishment or the like. The illustrated environment 500 includes a floor 545, walls 543A and 543B, and a ceiling 541. Sources of natural illumination may be provided by windows 560 and 561. These sources of natural light 560 and 561 may provide dispersed ambient light to the entire environment 500. Installed in the ceiling may be sources of artificial light, such as software configurable lighting devices 551 and ceiling lamps 552. These sources of artificial light 551 and 552 may provide light with a specified distribution, such as 551D and 552D, respectively, to specific areas of the environment 500.

Also installed in the ceiling may be a display device 550. The ceiling installed display device 550 may be a software configurable device that present images and/or provides general illumination. The images presented on the display device 550 may be scenic images or other graphics. The presented images may change over time or in response to environmental conditions or for other reasons, such as being part of a video or sequence of images. The display device 550 may have a communication interface that enables wired and/or wireless communication with a light probe, such as light probe 510. The light probe 510, such as a light probe shown in FIGS. 1A-2, may be installed in a particular location within the environment 500.

The display device 550 and the light probe 510 may also communicate wirelessly with a wireless access point 590 that is servicing the environment 500, via one or more wireless communication protocols, such as a Wi-Fi, Bluetooth, BLE, Zigbee or the like. The wireless access point 590 may be coupled to processor 599. The processor 599 may be coupled to a memory 598. The memory 598 may store programming code for execution by respective processors, such as 210 of FIG. 2 or 599, image data (i.e., still, animated or video images) that may be presented and/or modified, and/or light information provided by the light probe 510 for use in modifying the image data.

As discussed with reference to FIGS. 1A-2, the light probe 510 provides measured light information from specific directions. In FIG. 5, these directions are shown as A, B C with reference to a center point through which passes a vertical axis of light probe 510. Note that, in the orientation illustrated in FIG. 5 the color component light information sensor (e.g., 1 of FIGS. 1A and 1B) of the light probe 510 is facing downward toward the floor 545. The ceiling-mounted display device 550 presents an image with a particular orientation with reference to the light probe 510 as well as with reference to the natural and artificial light sources 560, 561, 551 and 552. In order to provide accurate real-time simulation of an object presented by the display device 550, the position of light probe 510 relative to the display device 550, may be stored for accurate real-time light simulation of any object presented by the display device 550. The position information of the display device 550 (at a minimum), the positions of windows 560, 561 and/or artificial lights sources 551, 552 may be provided to the light probe 510 and the processor 599 when the devices are coupled together, for example, via a commissioning process, in a network, such as network 107 of FIG. 3.

The relative position information of the light probes to the display devices may be provided at various times, such as the commissioning of a display device or a light probe into the network 107, or in an ad hoc fashion based on some form of device-configuration discovery. For example, the light probe 510 may be configured initially with direction information, such as direction A is in an Eastward direction, facing a window, while direction B is in a Southward direction, facing a window, and direction C is into a room. The light probe 510 may also be configured to discover via common network discovery techniques near-by display devices, such as 550, and other light probes (not shown in this example) when connected to a network, such as network 107 of FIG. 3. Upon discovering near-by display devices, the light probe 510 and display device 550 may negotiate a connection that may include directional information of the light probe 510. Alternatively, the directional information may be provided after the connection is negotiated, such as with light information 411 of FIG. 4. For example, in order to facilitate the network discovery, the light probes and the display devices may be configured for wireless communication using one or more of wireless communication protocols, such as Bluetooth, BLE, Wi-Fi, LTE Direct, or the like.

Figure 9A:
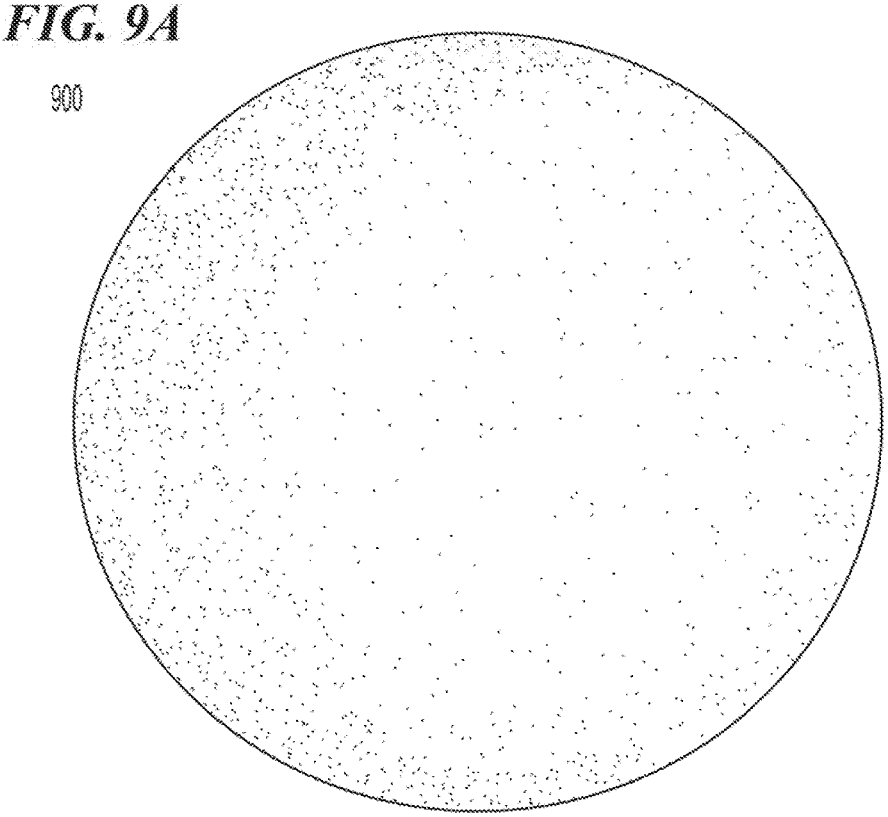
FIG. 9A illustrates an example of an object to be displayed by a display device, such as any of devices 345-385 of FIG. 3.
Figure 9B:
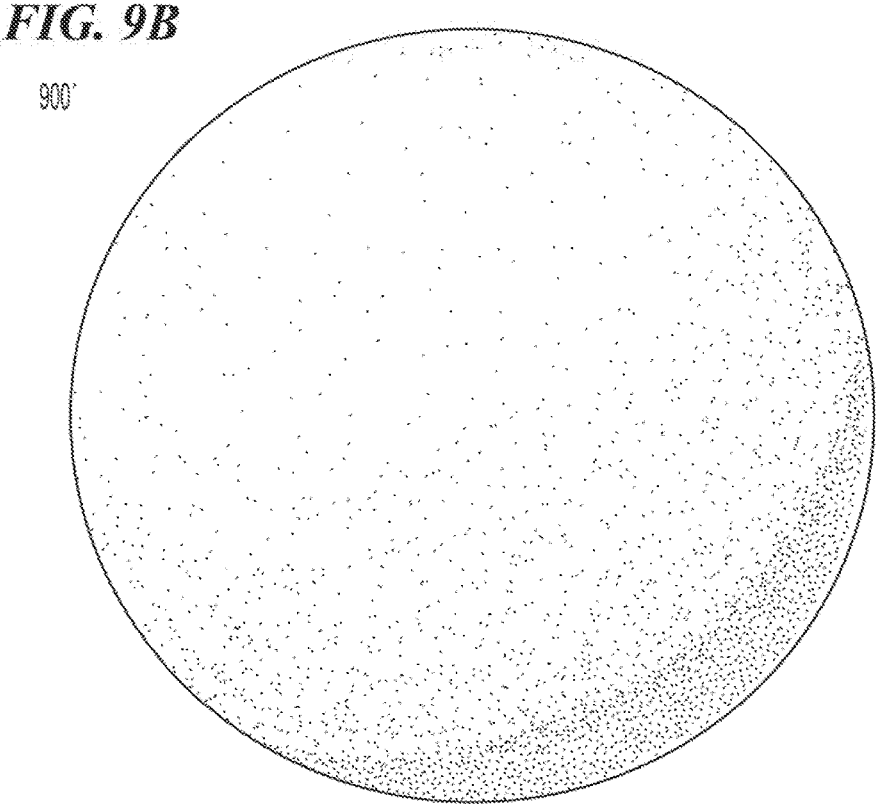
FIG. 9B illustrates the example of a displayed object, such as the object of FIG. 9A, modified based on ambient light information provided by an image probe, such as that of FIGS. 1A to 2 via a process like that illustrated in FIG. 4.

By identifying the relative directions (A, B and C) from which the light sensors, such as 2, 6 and 7 of FIG. 1A, of the light probe 510 measure light intensity with relation to the orientation of the object being presented on the display device 550, an image effect may be generated (see step 445 or steps 440 and 450 of FIG. 4) that accurately reflects the contribution of the light measured from each respective direction A, B and C as well as color component information from the color component sensor. For example, FIG. 9A illustrates an example of an object scene 900 that may be presented on display device 550. The object in the object scene 900 is a sphere illuminated with white light from all sides. After the intensity sensors and the color component sensor of the light probe 510 outputs their respective light information, the respective device, such as 510, 590 or 550, performs the image processing based on light characteristic information received from one or more light probes to generate an image effect. The image effect is generated and applied to the object image to provide a modified object scene. An example of a modification to object scene 900 is shown in FIG. 9B. In comparison to the object scene 900 of FIG. 9A, the sphere in the object scene 900' of FIG. 9B has a yellowish hue and also a shadow indicating that the sphere is illuminated from an upper left direction with yellow tinted light. Imagining the object scene 900' being presented on the ceiling-mounted display device 550, the object scene 900' may simulate the effect of a setting sun from one of directions A or B of the light probe 510.

To provide examples of these methodologies and functionalities and associated software aspects of the technology, it may be helpful to consider a high-level example of a system including light probes 510 and display devices 550, and examples of the image effect generation process flow 400 described with reference to FIG. 4 may be implemented by one or more devices, such as devices 510, 590 or 550.

Figure 6:
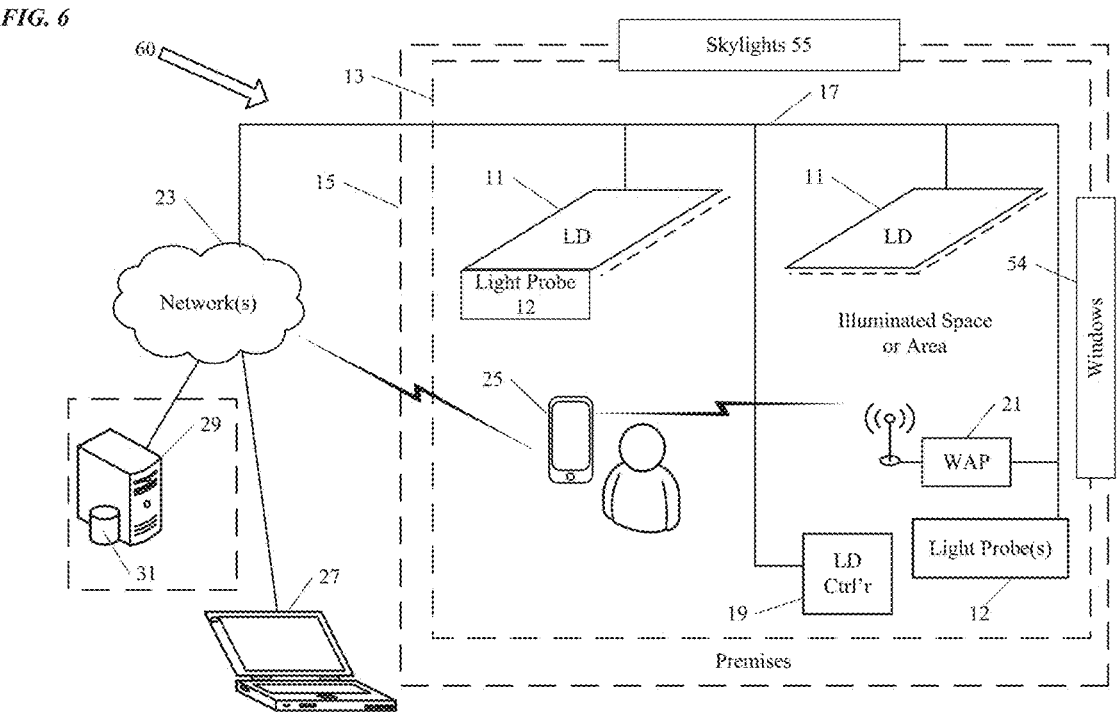
FIG. 6 is a high-level networking block diagram illustrating an example of a lighting system including a light probe, such as that shown in FIGS. 1A to 2, in an environment, such as that shown in FIG. 5.

FIG. 6 illustrates a system 60 for providing configuration or setting information, e.g. based on a user selection, to a software configurable lighting device (LD) 11. The LD 11 in some examples is a display device that is configured to provide general illumination lighting, such as task lighting or other lighting generated by a luminaire. For example, the LD 11 may have enhanced light sources or additional light sources that are controlled in response to programmed executed by a processor to provide general illumination of a selected distribution. For example, the software configurable LD 11 is configured to provide general illumination compliant with industry and/or governmental standards applicable to the area 13. The LD 11 is also a display device that presents the image representative of a luminaire or other object, such as sphere 900 of FIG. 9A. When the object image presented by the LD 11 is a luminaire, the general illumination function of the LD 11 may emulate the general illumination of the presented luminaire image. As a result, the LD 11 may output general illumination lighting in the area 13 that is typically provided by a type of luminaire presented as an image by the LD 11.

In FIG. 6, the software configurable lighting device 11, as well as some other elements of system 60, for illuminating space or area 13 are installed within premises 15. The premises 15 may be any location or locations serviced for lighting and other purposes by such a system of the type described herein. The space or area 13 of the premises 15 may include windows 54 and/or skylights 55 that are sources of natural light. Most of the examples discussed below focus on indoor building installations, for convenience, although the system may be readily adapted to measure light characteristic of outdoor lighting or any area in which light probes 12 are installed. Hence, the example of system 60 provides configurable lighting and possibly other services responsive to ambient lighting characteristics in a number of service areas in or associated with a building, such as various rooms, hallways, corridors or storage areas of a building and an outdoor area associated with a building. Any building forming, for example, an individual or multi-resident dwelling or may provide space for one or more enterprises and/or any combination of residential and enterprise facilities may benefit from a system 60 that includes light probes 12. A premises 15 may include any number of such buildings, and in a multi-building scenario the premises may include outdoor spaces and lighting in areas between and around the buildings, e.g. in a campus (academic or business) configuration.

The system elements, in a system like system 60 of FIG. 1, may include any number of software configurable lighting devices 11 as well as one or more lighting controllers 19. Lighting controller 19 may be configured to provide control of lighting and display related operations (e.g., ON/OFF, intensity, brightness, image data for presentation) of any one or more of the lighting devices 11. Alternatively, or in addition, lighting controller 19 may be configured to provide control of the software configurable aspects of lighting device 11. For example, the lighting controller 19 may be configured as the processor/server 335 of FIG. 3 that receives and processes light information from the respective light probes 12 as described above with reference to FIGS. 1A-4.

The light probes 12 may be implemented in intelligent standalone system elements such as shown in the drawing. In addition, or alternatively, the light probes 12 may be incorporated (as shown in FIG. 6) in one of the other system elements, such as one or more of the lighting devices 11 and/or the lighting controller 19.

Figure 12:
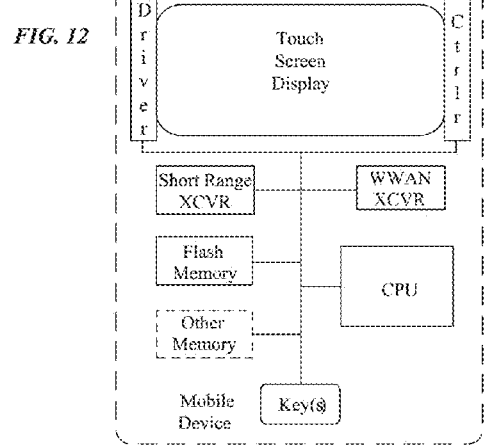
FIG. 12 is a simplified functional block diagram of a mobile device, as an alternate example of a user terminal device, for possible communication with a light probe, processing server and/or separate display device.

The on-premises system elements 11, 12, 19, in a system like system 60 of FIG. 6, are coupled to and communicate via a data network 17 at the premises 15. The data network 17 in the example also includes a wireless access point (WAP) 21 to support communications of wireless equipment at the premises 15. For example, the WAP 21 and network 17 may enable a user terminal for a user to control operations of any lighting device 11 at the premises 15. Such a user terminal is depicted in FIG. 12, for example, as a mobile device 25 within premises 15, although any appropriate user terminal may be utilized. However, the ability to control operations of a lighting device 11 may not be limited to a user terminal accessing data network 17 via WAP 21 or other on-premises access to the network 17. Alternatively, or in addition, a user terminal such as laptop 27 located outside premises 15, for example, may provide image processing services to one or more lighting devices 11 via one or more other networks 23 and the on-premises network 17. Network(s) 23 includes, for example, a local area network (LAN), a metropolitan area network (MAN), a wide area network (WAN) or some other private or public network, such as the Internet. In another example, a memory device, such as a secure digital (SD) card or flash drive, containing configuration data may be connected to one or more of the on-premises system elements 11, 12 or 19 in a system like system 60 of FIG. 6.

For image processing operations, the system elements for a given service area (11, 12 and/or 19) are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 6. Such data communication media may be wired and/or wireless, e.g. cable or fiber Ethernet, Wi-Fi, Bluetooth, or cellular short range mesh. In many installations, there may be one overall data communication network 17 at the premises. The data communication network 17 may exchange data via IP protocols, such as TCP/IP or the like, through wired, such as Ethernet, connections, or wireless, such as Wi-Fi, connections using common networking equipment. However, for larger premises and/or premises that may actually encompass somewhat separate physical locations, the premises-wide network 17 may actually be built of somewhat separate but interconnected physical networks utilizing similar or different data communication media.

System 60 also includes server 29 and database 31 accessible to a processor (not shown in this example) of lighting device controller 19, light probes 12 and/or LDs 11. Although FIG. 6 depicts server 29 as located outside premises 15 and accessible via network(s) 23, this is only for ease of discussion and no such requirement exists. Alternatively, server 29 may be located within premises 15 and accessible via network 17. In still another alternative example, server 29 may be located within any one or more system element(s), such as lighting device 11, lighting controller 19 or sensor 12. Similarly, although FIG. 6 depicts database 31 as physically proximate server 29, this is only for simplicity and no such requirement exists. Instead, database 31 may be located physically disparate or otherwise separated from server 29 and logically accessible by server 29, for example via network 17.

Database 31 is a collection of software control data files for use in conjunction with one or more of software configurable lighting devices 11 in premises 15 and/or similar devices 11 of the same or other users at other premises. For example, each configuration information file within database 31 includes lighting device configuration information to emulate a lighting distribution of a selected one of a number of types of luminaire. For example, the database 31 may store an image selection of a luminaire and a general lighting distribution selection as the software control data.

The database 31 may store computer programming instructions that cause either the server 29, the lighting device controller 19 or another device, such as a LD 11 or the light probe 12, to be configured to process light information received from the light probe 12, to generate an image effect. The processing device, such as server 29, a processor within lighting device controller 19, or a processor within light probe 12, by executing programming code, such as an image processing application, generates an image effect that is provided to the LD 11 for output.

In an operational example of the system 60 of FIG. 6, the lighting controller 19 receives a configuration file from device 25, server 29 or database 31. The configuration file may include an image file and a general illumination distribution file. The image file indicates a user selection of an image to be provided to the LD 11 for presentation, and the general illumination distribution file has data that is used for indicating a selected lighting distribution of the LD 11. The lighting controller 19 may store the received image file in memories, such as ROM or RAM of FIG. 10. Each image file includes image related data that enables a display device such as that incorporated in lighting device 11 to present an image.

A processor of lighting device controller 19 by accessing programming stored in memory, and using data in the image file and the general illumination distribution file controls the light distribution and image presentation of the lighting devices 11. For example, the lighting device controller 19 obtains distribution control data to achieve a predetermined image presentation and a predetermined light distribution for a general illumination application of a luminaire.

The light probes 12 may execute the process 400 described above with reference to FIG. 4. It may be appropriate at this time to discuss a system implementation that takes advantage of the benefits provided by the foregoing process 400 with reference to the system 60 of FIG. 6. As described above, the system 60 may include a LDs 11 that are configured to provide general illumination but also present an image. The image selection of a luminaire and the general lighting distribution selection are stored in a memory. The lighting device controller 19 may be configured to execute a process, such as process 400 of FIG. 4. Under control of the lighting controller 19, an image of a luminaire and a general lighting distribution are selected and obtained from memory, such as database 31 or an external server 29. The image is stored in an image file and the data describing the general lighting distribution is stored in a general lighting distribution file.

For example, the lighting controller 19 obtains via a communication interface the image file and the general lighting distribution file. The lighting device controller 19 provides the image file to the LD 11, which presents the image having an object, such as a luminaire. The lighting device controller 19 receives via a communication interface (shown in other examples) with the network 17 ambient light information measured by the light probe(s) 12. Based on the received ambient light characteristic information, the lighting device controller 19 may generate an image effect, such as relighting an object in an image, that will be applied to the image displayed on the lighting device 11. The lighting device controller 19 modifies the image by applying the generated image effect to the image. The lighting device controller 19 executes programming code that enable the lighting device controller 19 to control operation of the LD 11 device and present the modified image that is substantially similar to the selected luminaire image. For example, the lighting device controller 19 delivers the modified image file to the lighting device 19 via the network 17.

While in the foregoing example the lighting device controller 19 performed the light information receiving, image processing and image output functions, in other examples, these functions may be performed by other devices, such as the light probes 12, the server 29, the user terminal 27 or 25, or the like. For example, when the above functions are performed by the light probes 21, such as that described with reference to FIGS. 2 and 3, the light probes 21 may connect via the network 17 to the LDs 11. A processor, such as processor 210 of FIG. 2, of the light probe 21 may be configured to provide image processing services as well as images that are to be presented on the LDs 11. Using light information measured directly by the light probe 12, the light probe 12 processor may execute an image processing program that generates an image effect, such as a lighting effect as shown in FIGS. 9A and 9B. The generated image effect is applied to the image, and delivered via the network connection to the LDs 11. In examples in which multiple light probes 21 are within the area 13, one of the multiple light probes 12 may assume a leadership role and the other remaining light probes of the multiple light probes 12 may assume follower roles.

In such a leader-follower example, the leader light probe may receive light information from its own sensors as well as from each of the other light probes of the multiple light probes 12. Using the multiple light information inputs, the leader light probe may generate image effect.

Figure 7:
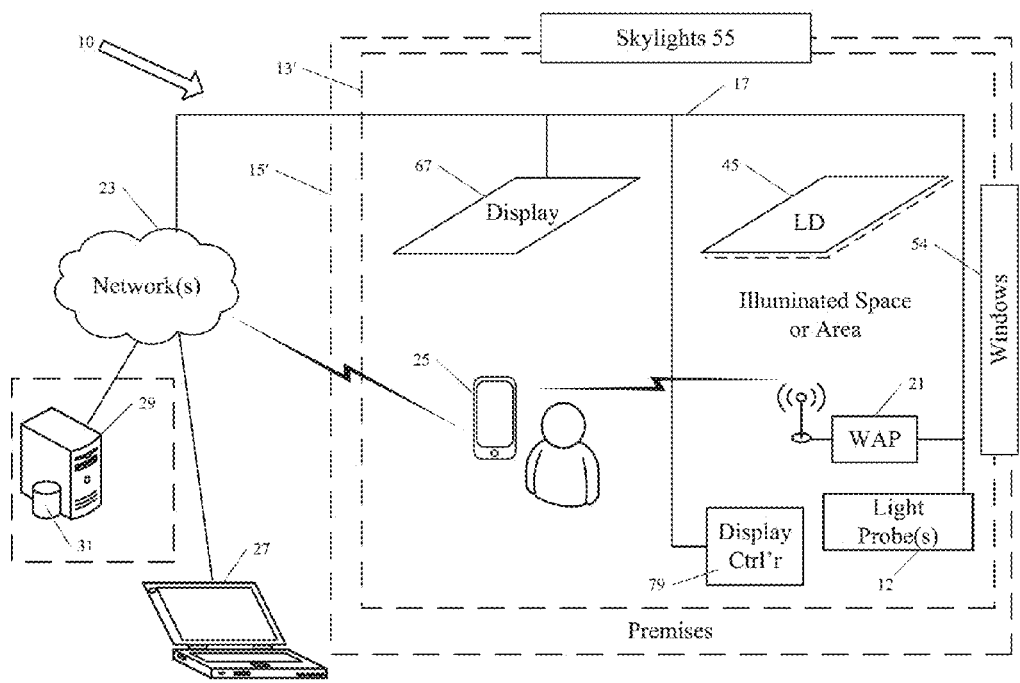
FIG. 7 is a high-level networking block diagram illustrating another example of a system including a light probe, such as that shown in FIGS. 1A to 2 in another environment example.

Other systems comprising a different array of display devices are also envisioned. For example, FIG. 7 illustrates a high level system example that includes system elements similar to those of system 10. For example, system 60 includes a network 23, a terminal 27, a server 29, a data store 31, a user terminal 25, wireless access point 21, windows 54 and skylights 55. In the system 10, the network 17 is coupled to a display 67 and not to lighting devices, such as lighting device 45. The lighting device 45 may provide general illumination of the area 13'. The display 67 may be a display device such as 345 or a ceiling mounted display device that presents images for decorative purposes. For the sake of brevity, a full description of the elements common between system 10 and system 60 will not be described in detail, but functions described with reference to FIG. 6 apply equally to those of FIG. 7 unless specifically described. The lighting device controller 19 of FIG. 6 is replaced with a display controller 79. In contrast to the lighting device controller 19 of FIG. 6, the display controller 79 does not provide general illumination information to the display 67, but only provides image data to the display 67. The provided image data includes the information needed for the display 67 to present an image of an object.

In an operational example, the light probes 12 measure ambient light received from the natural sources of light, such as windows 54 and skylights 55, as well as the artificial sources of light, such as light from the lighting device 45 within the area 13'. The light information is either processed by the light probes 12 or processed by the display controller 79 to generate an image effect that is applied to image data provided to the display 67. The generated image effect may be a relighting (e.g., a shading effect or other change in lighting of an object) of an object previously presented on the display 67.

In another system example, FIG. 8 provides an example of display devices that are not ceiling mounted. For example, FIG. 8 illustrates a high level system example that includes system elements similar to those of system 10. For example, system 80 includes a network 23, a terminal 27, a server 29, a data store 31, a user terminal 25, wireless access point 21, windows 54 and skylights 55. In the system 80, the network 17 is coupled to augmented reality goggles 36 and not to lighting devices, such as lighting device 88. The lighting devices 88 may provide general illumination of the area 13'. The light probes 12 may be implemented in intelligent standalone system elements such as shown in the drawing. In addition, or alternatively, the light probes 12 may be incorporated in one of the other system elements, such as one or more of the lighting devices 88 and/or the lighting controller 19'.

In an example, the light probes 12 are installed in the same general location as the augmented reality goggles 36. For example, the augmented reality goggles 36 may be located in the area 13" and the light probe 12 may be located on a ceiling or other location within the area 13". A processor, such as processor 335 of FIG. 3 may be located in the same area of the premises 15" or in another area of the premises 15", and be communicatively coupled to the light probe 12 and the augmented reality goggles 36. For example, the augmented reality goggles 36 may be configured for use by a visually-impaired person. In the example, a computer application may be executed by a processor of the augmented reality googles 36 causes the presentation of a scene of area 13" with visual cues that assist the visually-impaired user of the augmented reality goggles 36 by overlying navigational symbols over objects in presented room scene. For example, a desk, chair, floor lamp or other object in the room occupied by the user may be presented as a 3D object on the augmented reality goggles 36.

In order to improve upon the realistic presentation of the object on the augmented reality goggles 36, the light information provided by the light probes 12 may enable an image effect to be applied to the image of the 3D object presented on the augmented reality goggles 36. For example, at sunset or at some other time, the light in the area 13" may change causing shadows or other lighting-related changes to how an object would appear in the area 13". The light probes 12 detect the changes in the ambient lighting intensity and color, and provide lighting information reflecting the lighting changes to the display controller 19' for image processing. The display controller 19' processes the light information and generates an image effect based on the light information. The image effect is applied to the image data to provide modified image data to the augmented reality goggles 36.

Figure 11:
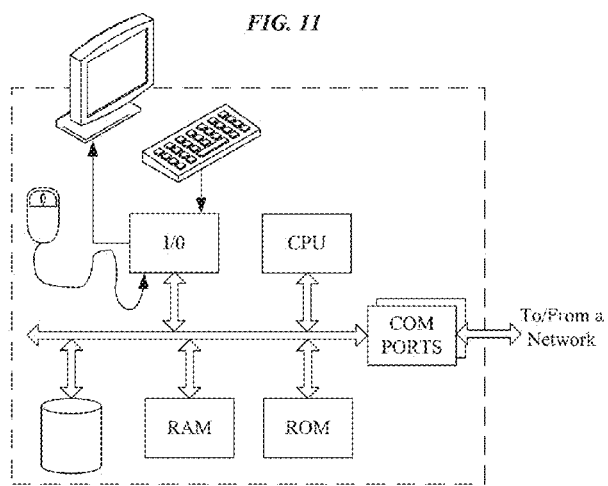
FIG. 11 is a simplified functional block diagram of a personal computer or other similar user terminal device, which may communicate with a light probe, processing server and/or separate display device.
Figure 10:
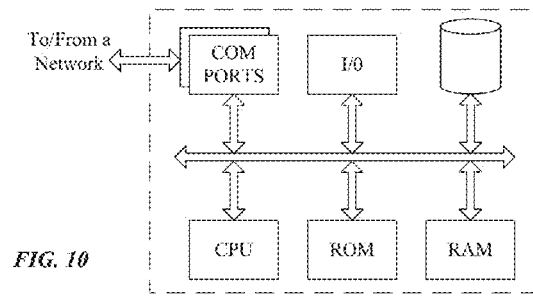
FIG. 10 is a simplified functional block diagram of a computer that may be configured as a processor or server, for example, to supply image processing services and data storage to a software configurable lighting apparatus in a system like one of those of FIGS. 3 and 6 to 8.

As shown by the above discussion, at least some functions may be implemented via communication with general purpose computers or other general purpose user terminal devices, although special purpose devices may be used. FIGS. 10-12 provide functional block diagram illustrations of exemplary general purpose hardware platforms.

FIG. 10 illustrates a network or computer platform, as may typically be used to generate and/or receive lighting probe signals 12, such as microcontroller 210, and access networks and devices external to the lighting probe 12, such as processor system 335 of FIG. 3. The computer platform of FIG. 10 may also be used to implement a processor, such as microcontroller 210 of FIG. 2. FIG. 11 depicts a computer with user interface communication elements, such as 240 or 317 as shown in FIGS. 2 and 3, respectively, although the computer of FIG. 11 may also act as a server if appropriately programmed. The block diagram of a hardware platform of FIG. 12 represents an example of a mobile device, such as a tablet computer, smartphone or the like with a network interface to a wireless link, which may alternatively serve as a user terminal device for providing a user communication with a lighting device, such as 11, light probe 12, or a processor, such as 335 of FIG. 3. It is believed that those skilled in the art are familiar with the structure, programming and general operation of such computer equipment and as a result the drawings should be self-explanatory.

A server (see e.g. FIG. 10), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. A server, such as that shown in FIG. 10, may be accessible or have access to a display device, such as 345-385, a lighting device 11 and/or lighting probe 12 via a network, such as 107. For example, the server may deliver in response to a user request a configuration information file. The information of a configuration information file may be used to configure a display device, such as devices 345-385, to provide an image file for presentation by a display device, and/or set the light output parameters for providing general illumination distribution. In some examples, the configuration information include an image for display by the display device and/or at least a general illumination setting of a device. Configuration data may also be provided for other states, e.g., for when the virtual luminaire is to appear OFF, in the same or a separate stored data file.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 11). A mobile device (see FIG. 19) type user terminal may include similar elements, but will typically use smaller components that also require less power, to facilitate implementation in a portable form factor. The example of FIG. 19 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 10 and the terminal computer platform of FIG. 11 are shown by way of example as using a RAM type main memory and a hard disk drive for mass storage of data and programming, whereas the mobile device of FIG. 12 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 11). The mobile device example in FIG. 12 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

The user device of FIG. 11 and the mobile device of FIG. 12 may also interact with a display device, such as 345-385, in order to enhance the user experience. For example, third party applications stored as programs may correspond to control parameters of a software configurable lighting device, such as image display and general illumination lighting distribution. In addition in response to the user controlled input devices, such as I/O of FIG. 18 and touchscreen display of FIG. 12, the display device, in some examples, is configured to accept input from a host of sensors including light probes 12 of FIGS. 6-8. These sensors may be directly tied to the hardware of the display devices, the light probes or be connected to the platform via a wired or wireless network.

As also outlined above, aspects of the techniques form operation of an ambient light sensing device and any system interaction therewith, may involve some programming, e.g. programming of the ambient light sensing device or any server or terminal device in communication with the lighting device. For example, the mobile device of FIG. 12 and the user device of FIG. 11 may interact with a server, such as the server of FIG. 10, to obtain a configuration information file that may be delivered to a software configurable lighting device 11, other display device, or a processor, such as 335. Subsequently, the mobile device of FIG. 12 and/or the user device of FIG. 11 may execute programming that permits the respective devices to interact with the software configurable lighting device 11 to provide configuration files including image files and/or general illumination distribution files. The mobile device of FIG. 12 and/or the user device of FIG. 11 may provide the 3D image processing software and processing to generate and apply an image effect based on ambient lighting information provided by one or more of the described light probes and/or light sensing systems. The executed programming may also permit the respective devices to provide image processing services to the systems and devices described in the various examples. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, display devices, light probes, sensors, user interface devices, other non-lighting-system devices, etc. of or coupled to a system, such as 10, 60 and 80 via communication interfaces (240 of FIG. 2 or 317 of FIG. 3), including both programming for individual element functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting system, comprising:
   a light probe comprising:
      directional light intensity sensors configured to measure light intensity of ambient light received from more than one direction with respect to a center point of the light probe; and
      a color component sensor configured to measure color components of the ambient light;
   a lighting device comprising an image display device that presents an image and outputs general illumination;
   a communication interface coupled to an external source; and
   a processing system, in or in communication with the image display device, comprising:
      a memory;
      a processor coupled to the memory, the communication interface and the light probe, and coupled to control operation of the image display device; and
      programming in the memory, wherein execution of the programming by the processor configures the processing system to perform functions including functions to:
         receive configuration data from the external source, the configuration data includes a selected image of a luminaire and a general lighting distribution selection;
         obtain the selected image of the luminaire from the configuration data for output via the display device;
         obtain ambient light information measured by the light probe;
         modify the selected image by applying an image effect that is generated at least in response to the ambient light information;
         control operation of the image display device to present the modified image of the luminaire as the presented image; and
         generate a general lighting distribution for illumination based on the general lighting distribution selection.

2. The lighting system of claim 1, wherein the light probe further comprises:
   a housing to which the directional light intensity sensors are attached at predetermined locations about a perimeter of the housing relative to an axis perpendicular to a reference surface, wherein:
   the axis extends through the center point of the light probe;
   the directional light intensity sensors are oriented to receive and measure ambient light intensity from different directions around the axis;
   the color component sensor is attached to the housing; and
   circuitry, coupled to the directional light intensity sensors, to produce directional light data based on the measurements by the directional light intensity sensors.

3. The lighting system of claim 2, wherein the circuitry is an analog-to-digital converter and a processor, wherein the produced directional light data is ambient light intensity data, and includes an indication of a direction associated with at least one directional light intensity sensor of the directional light intensity sensors.

4. The lighting system of claim 3, wherein color characteristic data includes color components of the ambient light measured by the color component sensor.

5. The lighting system of claim 2, wherein the directional light intensity sensors comprise:
   a first, a second and a third ambient light intensity sensor, wherein:
   each of the first, second and third ambient light intensity sensors is attached at a respective predetermined location around the axis;
   each of the first, second and third ambient light intensity sensors are oriented to receive and measure ambient light intensity from three respective different directions; and
   each of the first, second and third ambient light intensity sensor produces directional light intensity data based on the light intensity measured at the respective predetermined locations about the axis.

6. The lighting system of claim 1, wherein the image display device is a display device selected from a group consisting of: an organic light emitting diode display device, a non-organic light emitting diode display device, a plasma display device, and a liquid crystal display device.

7. A method, comprising:

receiving configuration data from an external source, wherein the configuration data includes a selected image of a luminaire and a general lighting distribution selection;

presenting on an image display device located in a premises, an image of luminaire based on the image selection in the configuration data;

outputting from the image display device illumination light based on the general lighting distribution selection;

measuring an intensity of the ambient light in the premises by a first sensor of a probe, the first sensor being positioned and oriented in a first direction with reference to a central axis of the probe;

measuring an intensity of the ambient light in the premises by a second sensor of the probe positioned and oriented in a second direction with reference to the central axis of the probe;

measuring an intensity of the ambient light in the premises by a third sensor of the probe positioned and oriented in a third direction with reference to the central axis of the probe, wherein the first, second and third directions are different from one another;

measuring color components of the ambient light by a color component sensor of the probe;

providing, in real time, ambient light intensity values based on the measurements by the first, second and third sensors and direction values indicating the direction from which the ambient light intensity value was measured;

providing, in real time, color component values of the ambient color components based on the measurements by the color component sensor;

generating, by a processor, an image effect utilizing the provided ambient light intensity values, direction values and color component values that accounts for the changes of ambient light in the premises; and applying the generated image effect to the image of the object presented on the image display device to provide a modified image, wherein the applied generated image effect alters an appearance of the image on the image display device based on changes to ambient light in the premises.

8. The method of claim 7, wherein the color component sensor is oriented in a fourth direction different from the first, second and third directions.

9. The method of claim 7, further comprising:

prior to measuring an intensity of the ambient light in a premises, identifying an orientation of the first direction of the first sensor, the second direction of the second sensor and the third direction of the third sensor of the probe by referencing an orientation of the image presented on the display device.

10. The method of claim 7, further comprising:

prior to measuring an intensity of the ambient light in a premises, establishing a connection via a network between the display device and the probe, wherein the probe further comprises the processor.

11. The method of claim 7, further comprising:

prior to measuring an intensity of the ambient light in a premises, establishing a connection via a network between the processor and the display device or the probe, wherein the processor is located remote from the probe and the display device.

12. The method of claim 7, further comprising:

after passage of a predetermined time, repeating each of the measuring, providing, generating and applying steps.

* * * * *